United States Patent
Gonzalez et al.

(10) Patent No.: US 9,815,517 B2
(45) Date of Patent: *Nov. 14, 2017

(54) BICYCLE SHOCK ASSEMBLIES WITH PLUNGER OPERATED VALVE ARRANGEMENT

(71) Applicant: Trek Bicycle Corporation, Waterloo, WI (US)

(72) Inventors: Jose Gonzalez, Santa Clarita, CA (US); Gregory Buhl, Pasadena, CA (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,622

(22) Filed: Jun. 16, 2015

(65) Prior Publication Data

US 2016/0096584 A1    Apr. 7, 2016

Related U.S. Application Data

(63) Continuation of application No. 12/484,595, filed on Jun. 15, 2009, now Pat. No. 9,056,650.

(51) Int. Cl.

| | |
|---|---|
| *F16F 9/48* | (2006.01) |
| *B62K 25/08* | (2006.01) |
| *F16F 9/02* | (2006.01) |
| *B62K 25/04* | (2006.01) |

(52) U.S. Cl.
CPC ............... *B62K 25/08* (2013.01); *F16F 9/48* (2013.01); *F16F 9/486* (2013.01); *B60G 2202/242* (2013.01); *B60G 2300/12* (2013.01); *B62K 2025/048* (2013.01); *F16F 9/0218* (2013.01); *F16F 9/0236* (2013.01)

(58) Field of Classification Search
CPC ........ F16F 9/0218; F16F 9/0236; F16F 9/486; F16F 9/48; B60G 2202/242; B60G 2300/12; B62K 2025/042; B62K 25/08
USPC ....... 188/301, 284, 288, 289, 297, 312, 313, 188/316, 317, 322.15; 267/64.16, 64.17, 267/64.18, 64.22, 64.26; 280/5.515, 280/5.519

See application file for complete search history.

(56) References Cited

U.S. PATENT DOCUMENTS

| | | | | |
|---|---|---|---|---|
| 1,655,786 | A * | 1/1928 | Guerritore | F16F 9/486 188/289 |
| 2,423,736 | A * | 7/1947 | Tack | B64C 25/60 188/289 |
| 2,833,380 | A * | 5/1958 | Carpenter | F16F 9/486 188/266 |

(Continued)

*Primary Examiner* — Thomas Irvin

(57) ABSTRACT

A shock absorber, which is particularly applicable to bicycles, includes a secondary chamber whose volume selectively contributes to a volume associated with a primary chamber of the shock. A piston is supported by a compression rod and cooperates with a shock tube to define the primary chamber. The secondary chamber is fluidly isolated from the primary chamber by a valve arrangement positioned proximate the piston. A plunger extends along a longitudinal length of the shock and forms or interacts with the valve arrangement such that the secondary chamber is selectively fluidly connected to the primary chamber so the primary and secondary chambers of the shock assembly contribute to the performance of the shock for a selected portion of shock travel.

10 Claims, 16 Drawing Sheets

(56) References Cited

U.S. PATENT DOCUMENTS

| | | | | |
|---|---|---|---|---|
| 2,959,410 A | * | 11/1960 | Fullam | F16F 9/063 267/64.25 |
| 3,412,870 A | * | 11/1968 | Rollins | B61G 9/08 188/317 |
| 3,525,449 A | * | 8/1970 | Zanow | B61G 9/08 188/269 |
| 3,578,303 A | * | 5/1971 | Fullam | B64C 25/60 267/64.22 |
| 3,595,349 A | * | 7/1971 | Ortheil | B60G 17/08 188/289 |
| 4,039,177 A | * | 8/1977 | Person | F16F 9/342 188/289 |
| 4,061,295 A | * | 12/1977 | Somm | B64C 25/60 188/266.2 |
| 4,405,119 A | * | 9/1983 | Masclet | B60G 15/12 188/288 |
| 4,624,346 A | * | 11/1986 | Katz | F16F 9/486 188/282.9 |
| 4,807,860 A | * | 2/1989 | Simons | B62K 25/08 188/280 |
| 5,009,400 A | * | 4/1991 | Ott | B60G 17/04 267/64.11 |
| 5,094,321 A | * | 3/1992 | Neumann | F16F 9/512 188/282.3 |
| 5,152,547 A | * | 10/1992 | Davis | B60G 17/018 188/313 |
| 5,295,563 A | * | 3/1994 | Bennett | B60G 17/0152 188/266.2 |
| 5,417,446 A | * | 5/1995 | Pileggi | B62K 25/08 188/282.5 |
| 5,509,513 A | * | 4/1996 | Kiesel | F16F 9/486 188/289 |
| 5,682,967 A | * | 11/1997 | Wiard | F16F 9/486 188/289 |
| 5,862,895 A | * | 1/1999 | Ricard | F16F 9/43 188/287 |
| 5,890,568 A | * | 4/1999 | De Kock | F16F 9/512 188/266.5 |
| 5,988,607 A | * | 11/1999 | Beck | B60G 17/0424 267/218 |
| 6,592,136 B2 | * | 7/2003 | Becker | B62K 25/08 188/282.1 |
| 6,938,887 B2 | * | 9/2005 | Achenbach | B60G 17/08 188/315 |
| 7,740,256 B2 | * | 6/2010 | Davis | B60G 3/20 188/317 |
| 2007/0262501 A1 | * | 11/2007 | Cheever | B62K 25/08 267/64.11 |
| 2011/0181009 A1 | * | 7/2011 | Lude | B62K 25/08 280/65 |
| 2015/0137478 A1 | * | 5/2015 | Shirai | B62K 25/08 280/283 |

* cited by examiner

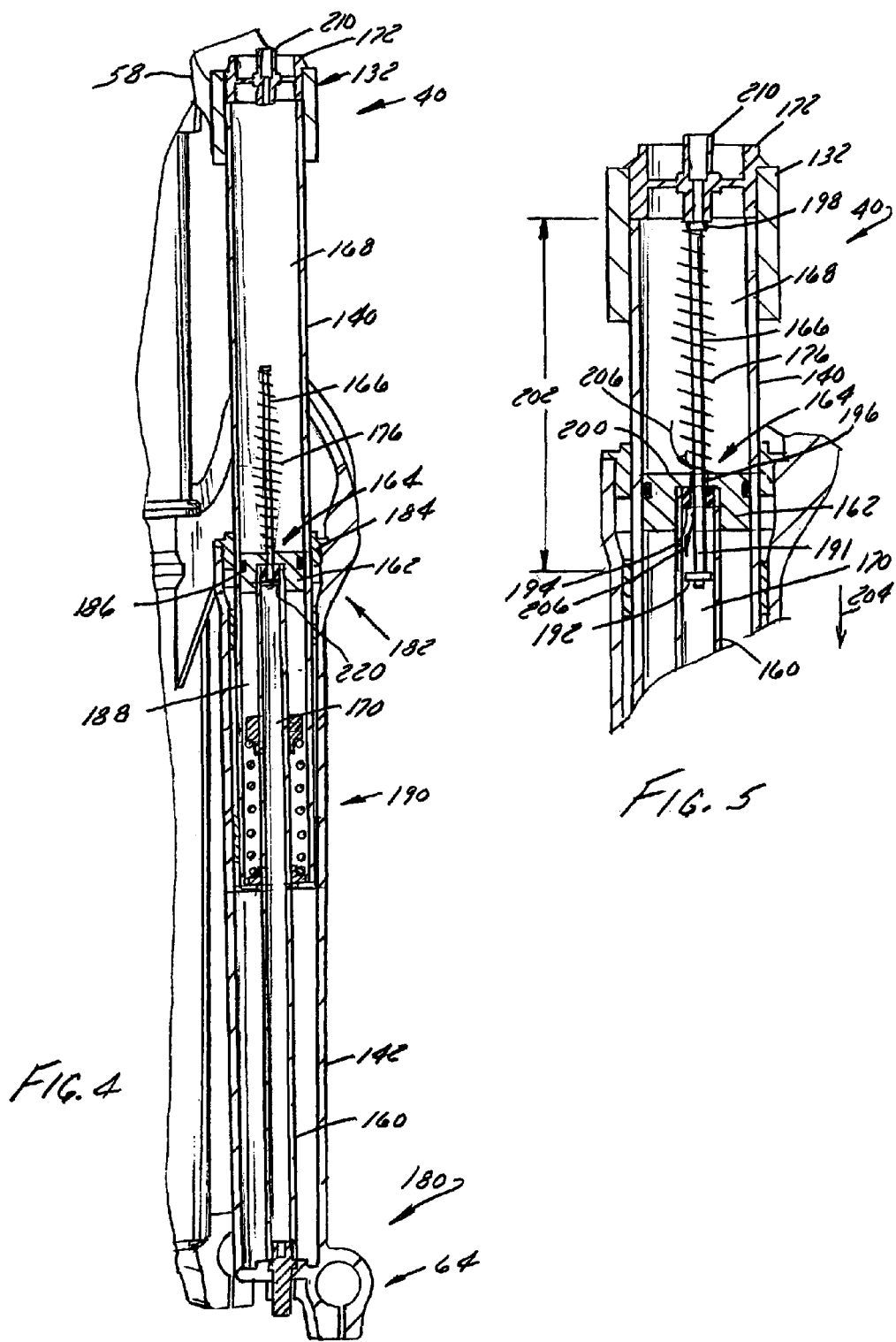

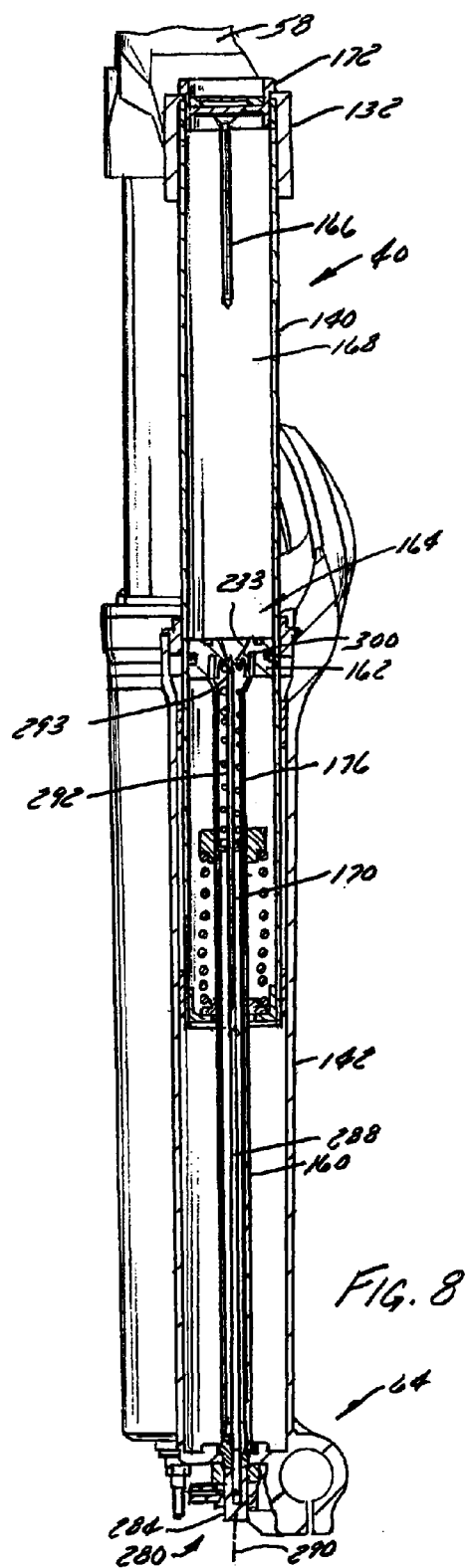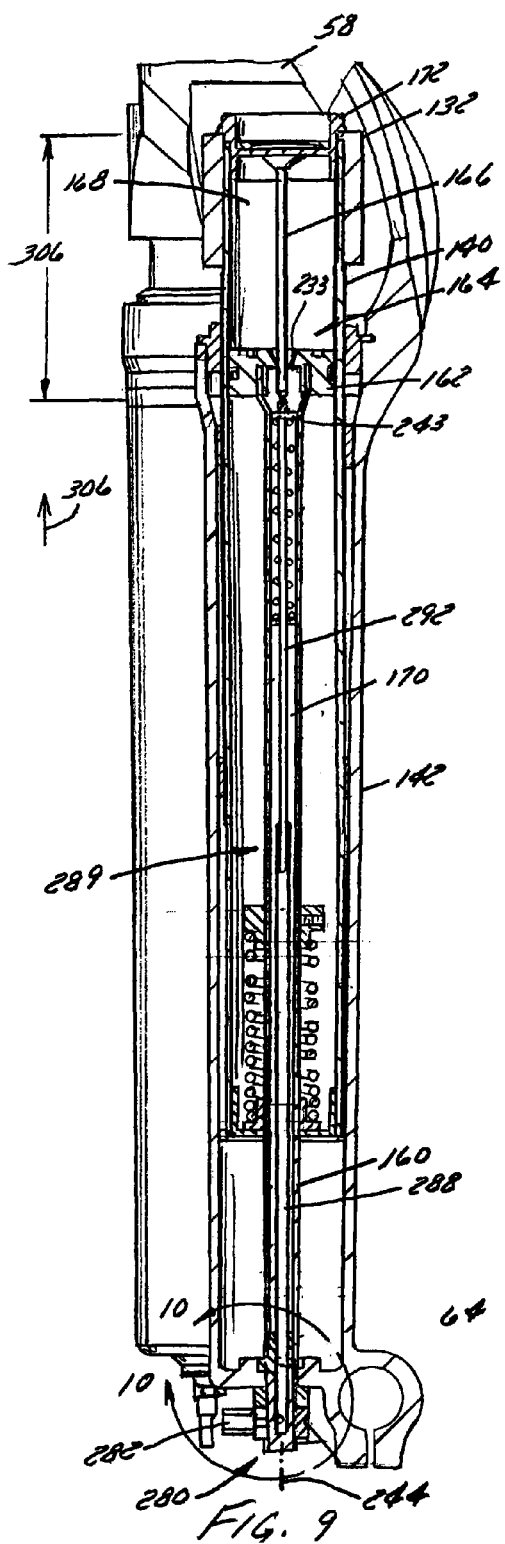

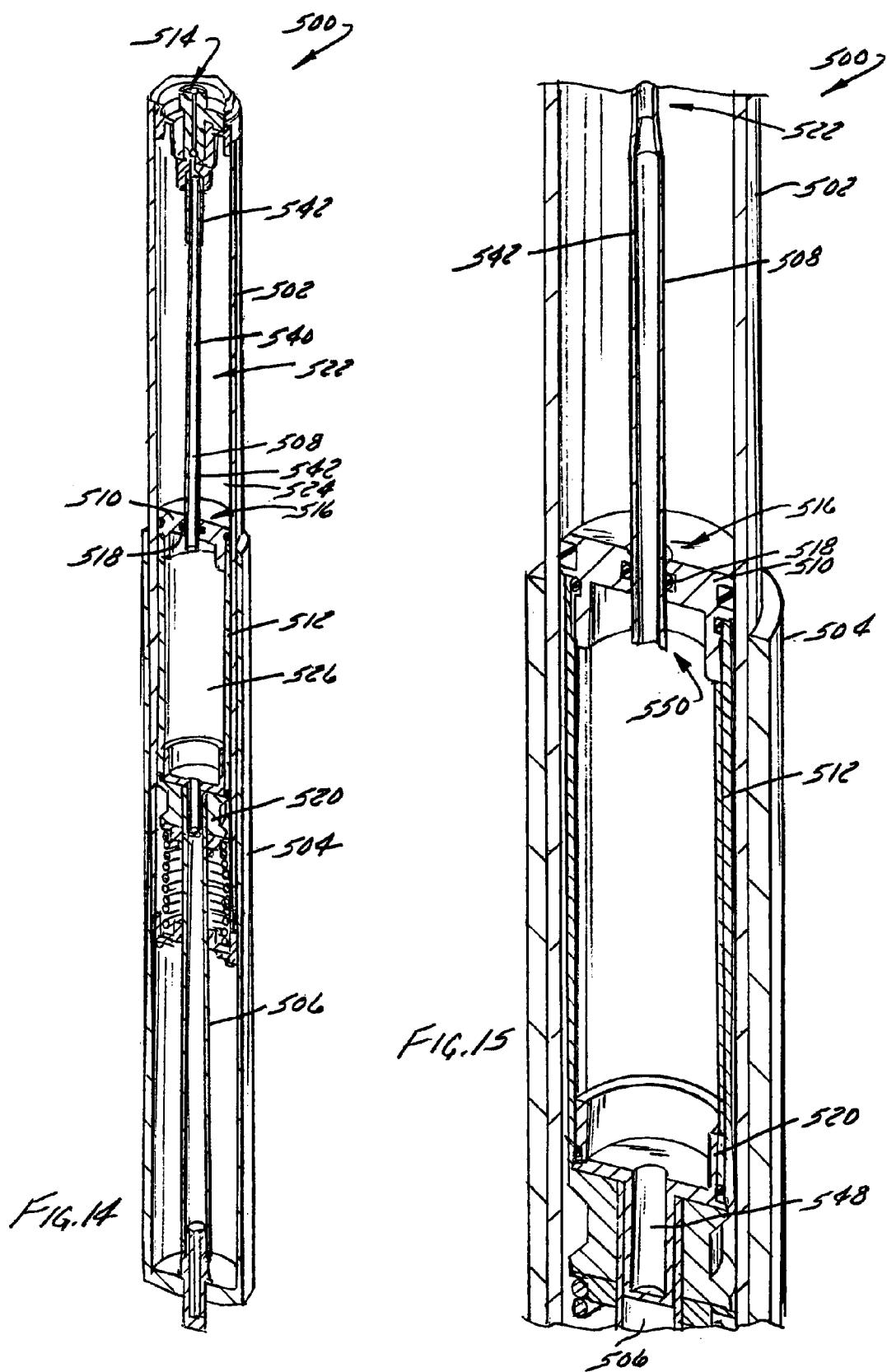

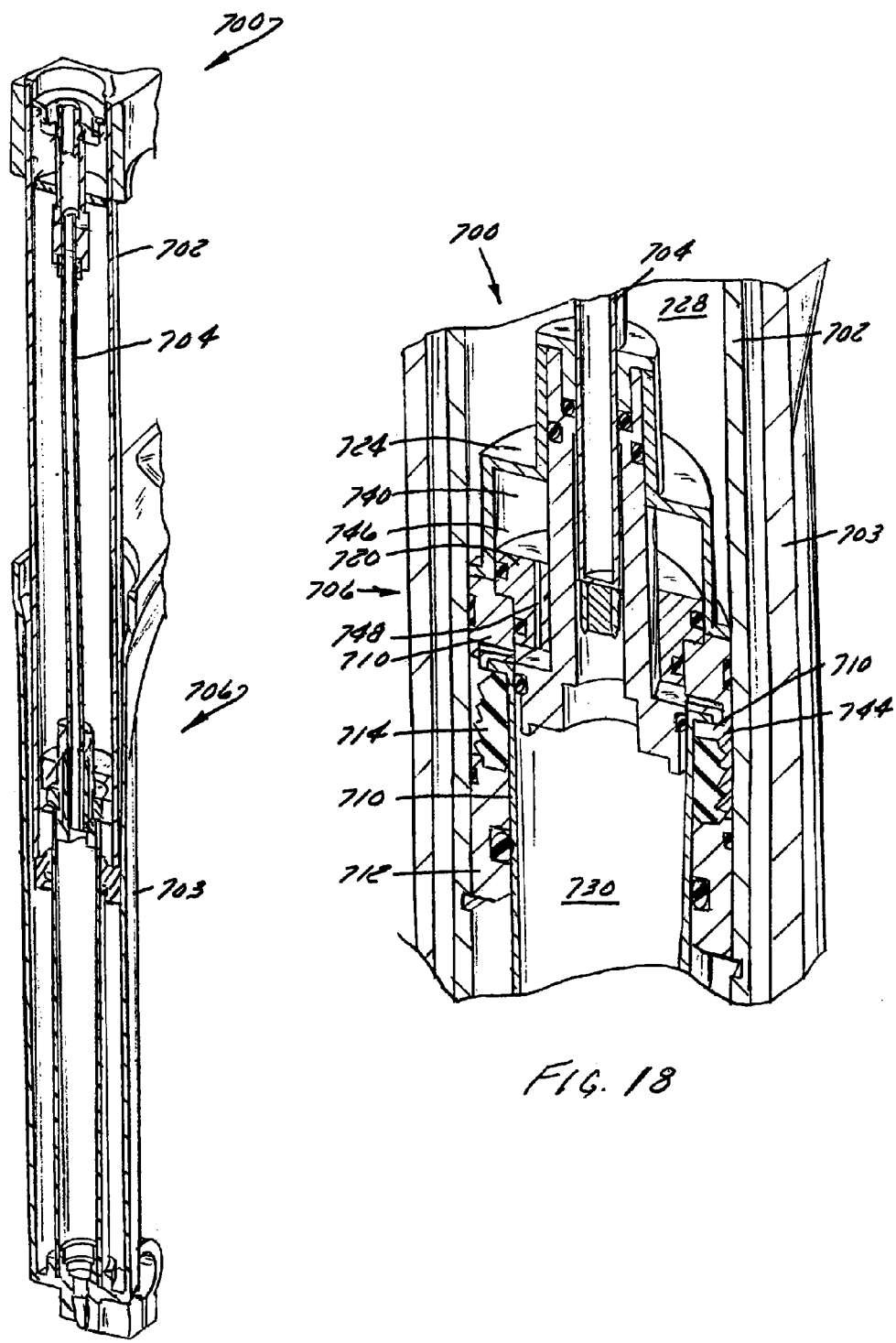

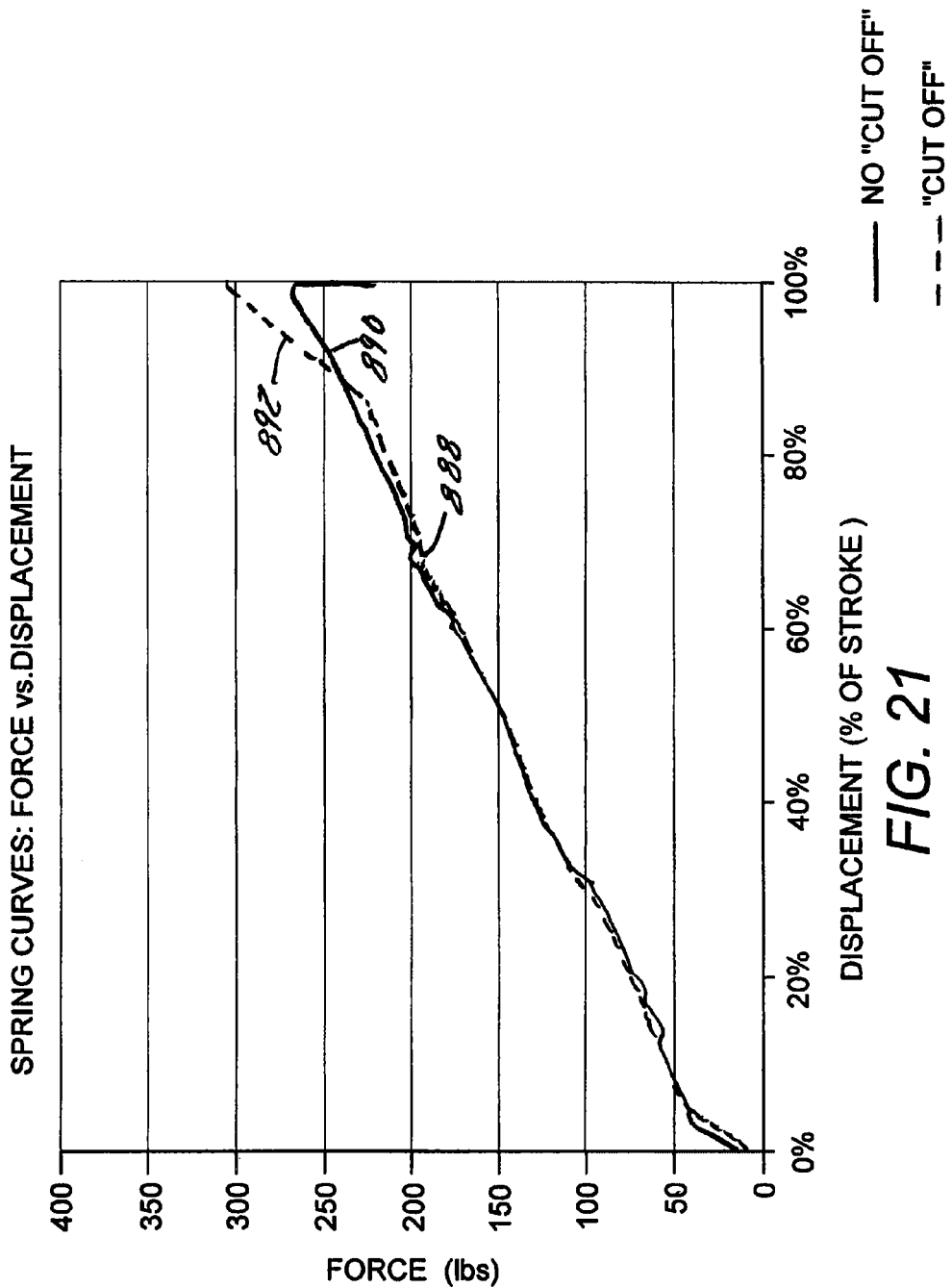

BICYCLE SHOCK ASSEMBLIES WITH PLUNGER OPERATED VALVE ARRANGEMENT

CROSS-REFERENCE TO RELATED APPLICATIONS

This application is a Continuation of U.S. application Ser. No. 12/484,595, filed Jun. 15, 2009, titled "BICYCLE SHOCK ASSEMBLIES WITH PLUNGER OPERATED VALVE ARRANGEMENT," now U.S. Pat. No. 9,056,650, which is incorporated herein by reference in its entirety.

BACKGROUND OF THE INVENTION

The present invention relates generally to bicycles and, more particularly, to shock assemblies that are constructed to facilitate controlled movement between movable members of a bicycle, such as a frame and a wheel assembly.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together with a rear dropout for supporting the rear axle of the rear wheel. The front wheel assembly is commonly mounted between a pair of forks that are pivotably connected to the frame proximate the head tube. The foregoing description represents the construction of a conventional bicycle frame which of course does not possess a suspension having any shock absorbing characteristics.

The increased popularity in recent years of off-road cycling, particularly on unpaved terrain or cross-country, as well as an interest in reducing discomfort associated with rougher road riding, has made shock absorbing systems a desirable attribute in biking system. A bicycle with a properly designed suspension system is capable of traveling over extremely bumpy, uneven terrain and up or down very steep inclines. Suspension bicycles are less punishing, reduce fatigue, reduce the likelihood of rider injury, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles.

Over the last several years the number of bicycles now equipped with suspension systems has dramatically increased. In fact, many bicycles are now fully suspended, meaning that the bicycle has both a front and rear wheel suspension systems. Front suspensions were the first to become popular. Designed to remove the pounding to the bicycle front end, the front suspension is simpler to implement than a rear suspension. A front suspension fork is easy to retrofit onto an older model bicycle. On the other hand, a rear suspension will increase traction and assist in cornering and balance the ride.

During cycling, as the bicycle moves along a desired path, discontinuities of the terrain are communicated to the assembly of the bicycle and ultimately to the rider. Although such discontinuities are generally negligible for cyclists operating on paved surfaces, riders venturing from the beaten path frequently encounter such terrain. With the proliferation of mountain biking, many riders seek the more treacherous trail. Technology has developed to assist such adventurous riders in conquering the road less traveled. Wheel suspension systems are one such feature.

Even though suspension features have proliferated in bicycle constructions, the performance of the suspension as well as the structure of the bicycle are often limited to or must be tailored to cooperate with the structure and operation of the shock. Commonly, as the bicycle traverses uneven terrain or during aggressive riding, the overall length of the shock shortens and thereby compresses a volume of air or gas enclosed by the shock. As the shock continues to shorten, a piston supported by a compression rod continues to compress the fluid as the size of the chamber continues to get smaller. As compression of the gas continues, the shock becomes progressively more resistive to allowing continued shortening of the shock. That is, the compressibility of the gas contained in the shock results in the shock feeling progressively stiffer as the overall shock length continues to shorten. Such operation detracts from the range of movement of the shock wherein a desired shock performance can be attained and/or requires greater shock lengths to accommodate a desired range of motion dampening operation.

Therefore, there is a need for a shock system that is more responsive to loading across a wider range of the overall compressibility of the shock. There is a further need for a shock system that can provide a variety of shock performances without otherwise interfering with the mounting of the shock to the bicycle.

BRIEF DESCRIPTION OF THE INVENTION

The present invention provides a shock or shock absorber for a bicycle that overcomes one or more of the drawbacks discussed above. A shock absorber according to one aspect of the invention includes a primary chamber and a secondary chamber that are separated by a valve assembly or valve arrangement. A piston is supported by a compression rod and cooperates with a shock tube to define the primary chamber. The secondary chamber is positioned on an opposite side of the piston and fluidly separates the primary and secondary chambers. A skewer or plunger extends a longitudinal length of the shock and cooperates with an opening formed in the piston to form the valve arrangement or manipulate a piston mounted valve assembly such that the secondary chamber is selectively fluidly connected to the primary chamber so as to alter the performance of the shock. Such a construction allows the secondary chamber to contribute to the shock performance only after a shock has undergone a selected displacement.

Another aspect of the invention usable with one or more of the features of the above aspect discloses a shock assembly for a bicycle. The shock assembly includes a first sleeve and a second sleeve that is engaged with the first sleeve such that the first sleeve and the second sleeve are connected in a telescopic manner. A piston is enclosed by the first and second sleeves and defines a first volume on one side of the piston and a second volume on an opposite side of the piston. A valve arrangement or assembly is provided between the first and second volumes and configured to fluidly separate the first volume from the second volume. The shock assembly includes a plunger that is configured to cooperate with the piston to selectively open the valve arrangement to fluidly connect the second volume to the first volume.

Another aspect of the invention usable with one or more of the features associated with the above aspects discloses a method of altering the in-use performance of a bicycle shock. The method includes forming a first chamber and a second chamber that are separated by a piston. The first and second chambers are fluidly connectable as a function of translation of a cap tube relative to a leg tube by translating a plunger through an opening formed in the piston.

Another aspect of the invention useable with one or more of the above aspects discloses a bicycle suspension system having a cap tube that is attached to a first bicycle structure and a leg tube that is attached to a second bicycle structure. The cap tube and the leg tube are telescopically associated to allow translation between the first and second bicycle structures. A piston is disposed in a cavity enclosed by the cap and leg tubes for enclosing a first volume whose pressure increases as distal ends of the cap and leg tubes move toward one another and separating the first volume from a second volume. A stem extends between the piston and a distal end of one of the leg tube and the cap tube. A plunger cooperates with the piston to fluidly connect the first and second volumes when the distal ends of the cap and leg tubes are a selected distance apart.

Preferably, the plunger or skewer extends from one of the first or second shock sleeves or tubes. Alternatively, the skewer can also extend from the valve. In various embodiments, the plunger is shaped to cooperate with an opening in the piston in sealing and non-sealing manners. Alternatively, a valve assembly can be supported by the piston and constructed to include a spring that biases the valve to a closed position and whose bias is overcome by the plunger or skewer. One aspect of supporting the spring includes providing a rib that extends from an interior surface of the compression rod or stem such that the spring is disposed between the rib and the valve.

Another aspect of the invention combinable with one or more of the above aspects includes constructing the plunger to include a bypass section that facilitates fluid communication between the first and second chambers via a space formed between the plunger and the piston or through a passage within the plunger. Preferably, the bypass section is provided to allow fluid communication between the first and second volumes when the top tube and leg tube are positioned away from a fully extended and a fully compressed orientation. More preferably, the volume of the plunger and/or a compression rod that supports the piston contributes to the volume of the second chamber.

Another aspect of the invention combinable with one or more of the above aspects includes providing another valve or fill valve assembly that fluidly separates the interior volume of the shock from atmosphere. In one aspect, the fill valve assembly is supported by one of the first and second sleeves for pressurizing the first volume. Preferably, the fill valve is disposed between the volume enclosed by the shock and atmosphere. In a further aspect, the fill valve assembly and the piston valve arrangement are connected so that the fill valve assembly can be selectively fluidly connected to either of the first or second volumes of the shock assembly by manipulation of the fill valve assembly.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

FIG. 4 is a cross-sectional view of the shock assembly taken along line 4-4 shown in FIG. 3;

FIG. 5 is a detailed view of a portion of the shock assembly shown in FIG. 4 showing the shock compressed a sufficient degree to operate the valve assembly that is internal thereto;

FIG. 8 is a view similar to FIG. 4 of a shock assembly according to yet another embodiment of the invention;

FIG. 9 is a view similar to FIG. 5 of the shock assembly shown in FIG. 8;

FIG. 11b is a view similar to FIG. 11 and shows a cross-section of the fill valve assembly that is generally transverse to the view shown in FIG. 11a;

FIG. 14 is a view similar to FIG. 4 of a shock assembly according to another embodiment of the invention;

FIG. 15 is a view similar to FIG. 5 of the shock assembly shown in FIG. 14;

FIG. 17 is a view similar to FIG. 14 of a shock assembly according to another embodiment of the invention;

FIG. 18 is a view similar to FIG. 15 of the shock assembly shown in FIG. 17;

FIG. 21 graphically shows the shock performance of shock assemblies equipped with differently shaped swaged compression rods shown in FIG. 19;

DETAILED DESCRIPTION OF THE PREFERRED EMBODIMENTS

Figure 1:
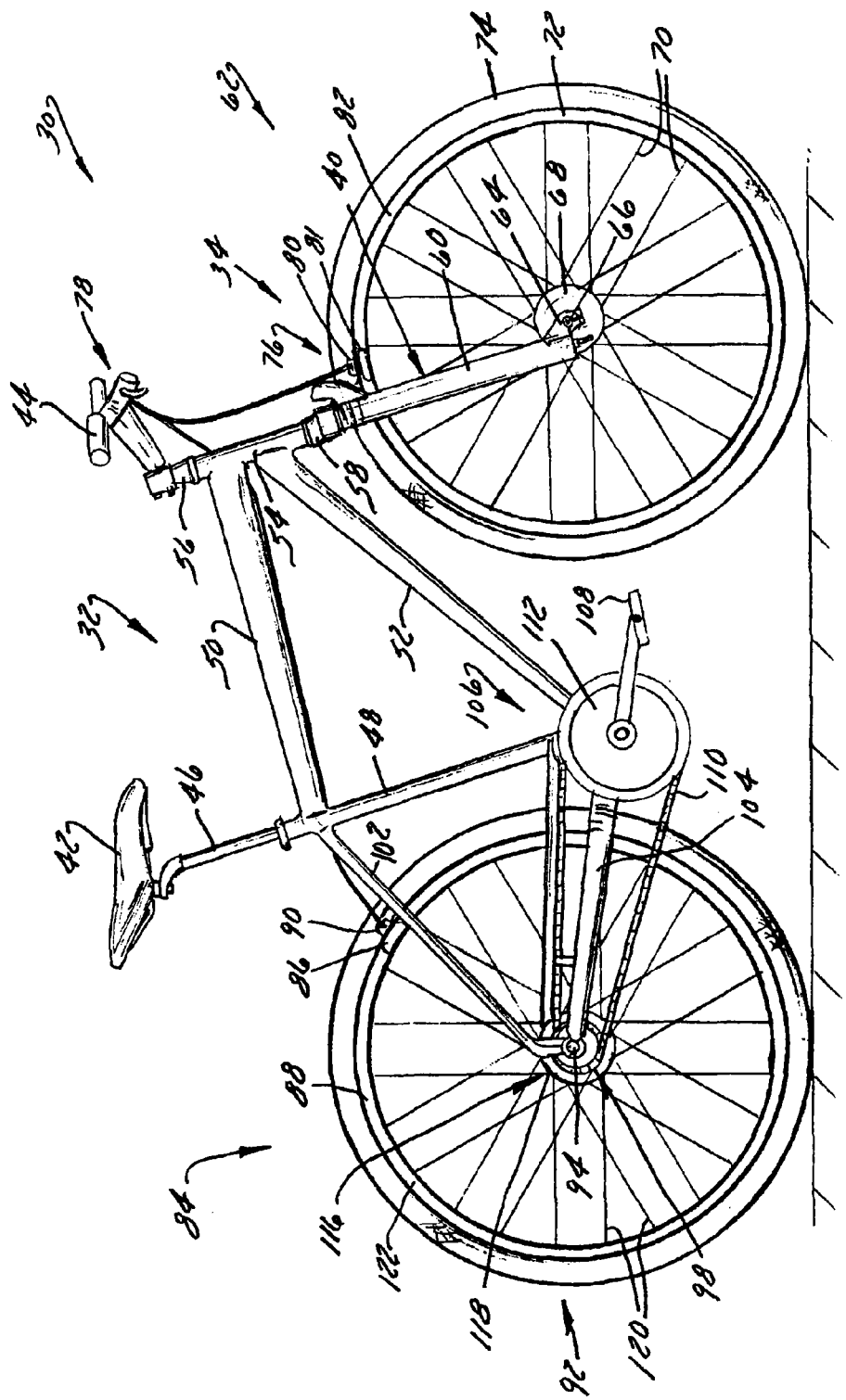
FIG. 1 is a side elevation view of a bicycle equipped with a shock assembly according to the present invention.

FIG. 1 shows a bicycle 30 having a frame assembly 32 equipped with at least one suspension system 34 that includes a shock absorber, shock assembly, or shock 40 that is constructed according to at least one of the embodiments of the present invention according to the present invention. Bicycle 30 includes a seat 42 and handlebars 44 that are attached to frame assembly 32. A seat post 46 is connected to seat 42 and slidably engages a seat tube 48 of frame assembly 32. A top tube 50 and a down tube 52 extend in a forward direction relative to seat tube 48 to a head tube 54 of frame assembly 32. Handlebars 44 are connected to a stem 56 that passes through head tube 54 and engages a fork crown 58. A pair of forks 60 extend from generally opposite ends of fork crown 58 and support a front wheel assembly 62 at an end of each fork or a fork tip 64. Fork tips 64 engage generally opposite sides of an axle 66 that cooperates with a hub 68 of front wheel assembly 62. A number of spokes 70 extend from hub 68 to a rim 72 of front wheel assembly 62. A tire 74 extends about rim 72 such that rotation of tire 74, relative to forks 60, rotates rim 72 and hub 68.

Preferably, each fork 60 is provided as a shock absorber 40 so as to allow translation of axle 66 of front wheel assembly 62 relative to frame assembly 32. Although each fork 60 is shown as having respective ends secured proximate one of frame assembly 32 and axle 66, it is appreciated that the hereafter description of shocks according to one or more of the embodiments of the present invention are equally applicable to bicycle rear wheel suspension features. One such rear wheel suspension system is disclosed in applicants co-pending U.S. Patent Application Publication No. 2008/0252040, the disclosure of which is incorporated herein.

Bicycle 30 includes a front brake assembly 76 having an actuator 78 attached to handlebars 44. Brake assembly 76 includes a caliper 80 that presses a pair of oppositely positioned brake pads 81 into a brake wall 82 of rim 72 to provide a stopping or slowing force to front wheel assembly 62. Bicycle 30 includes a rear wheel assembly 84 that also includes a brake assembly 86 having a caliper 90 that presses a pair of brake pads into a brake wall 88 of a rear wheel 92. Rear wheel 92 is positioned generally concentrically about a rear axle 94. Understandably, one or both of front wheel assembly 62 and rear wheel assembly 84 could be equipped with other brake assemblies or arrangements such as disc brake assemblies.

A seat stay 102 and a chain stay 104 extend rearward from seat tube 48 and offset rear axle 94 of rear wheel assembly 84 from a crankset 106. Crankset 106 includes oppositely positioned pedals 108 that are operationally connected to a chain 110 via a chain ring or sprocket 112. Rotation of chain 110 communicates a drive force to rear wheel assembly 84 of bicycle 30. A gear cluster 116 is positioned proximate axle 94 and is engaged by chain 110. Gear cluster 116 is generally concentrically orientated with respect to rear axle 94 and includes a number of variable diameter gears. Gear cluster 116 is operationally connected to a hub 118 of rear wheel 92 of rear wheel assembly 84. A number of spokes 120 extend radially between hub 118 and a rim 122 of rear wheel assembly 84. As is commonly understood, rider operation of pedals 108 drives chain 110 thereby driving rear wheel 92 which in turn propels bicycle 30.

Understandably, the construction of bicycle 30 shown in FIG. 1 is merely exemplary of a number of bicycle configurations usable with the shock assemblies of the present invention. That is, whereas bicycle 30 is shown as having only a front wheel shock assembly, it is envisioned that shock assemblies according to the present invention provide either front or rear wheel shock or vibration isolation. It is further appreciated that the shock constructions of the present invention are equally applicable to street or road bikes as well as other bicycle configurations such as mountain and/or dirt bikes. It is further appreciated that the shock assemblies of the present invention may be applicable to any of a number of vehicle configurations in addition to the bicycle configuration shown.

Figure 2:
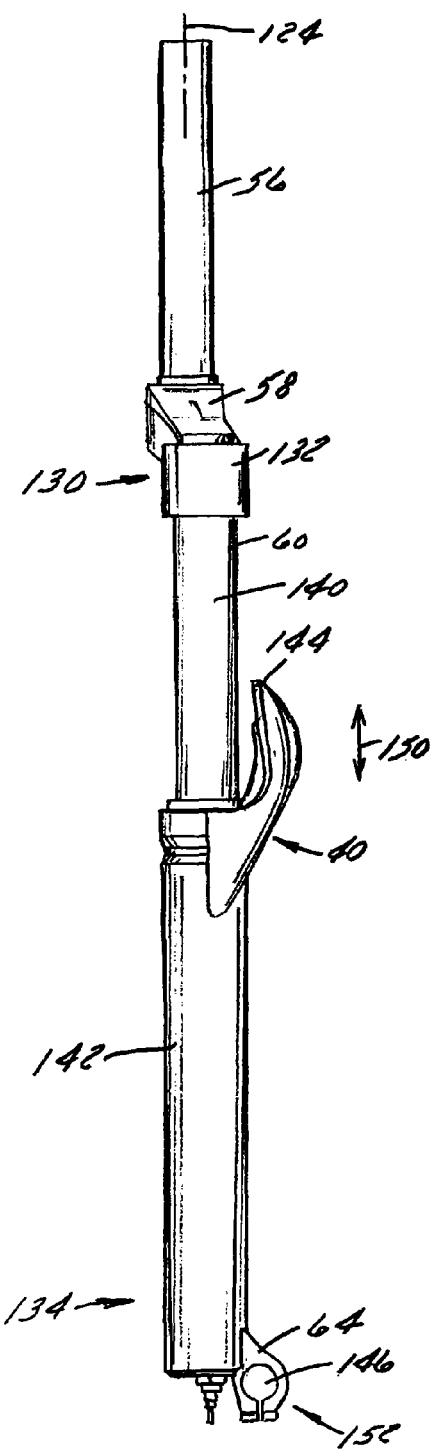
FIG. 2 is a side elevation view of the steerer assembly and shock assembly removed from the bicycle shown in FIG. 1.
Figure 3:
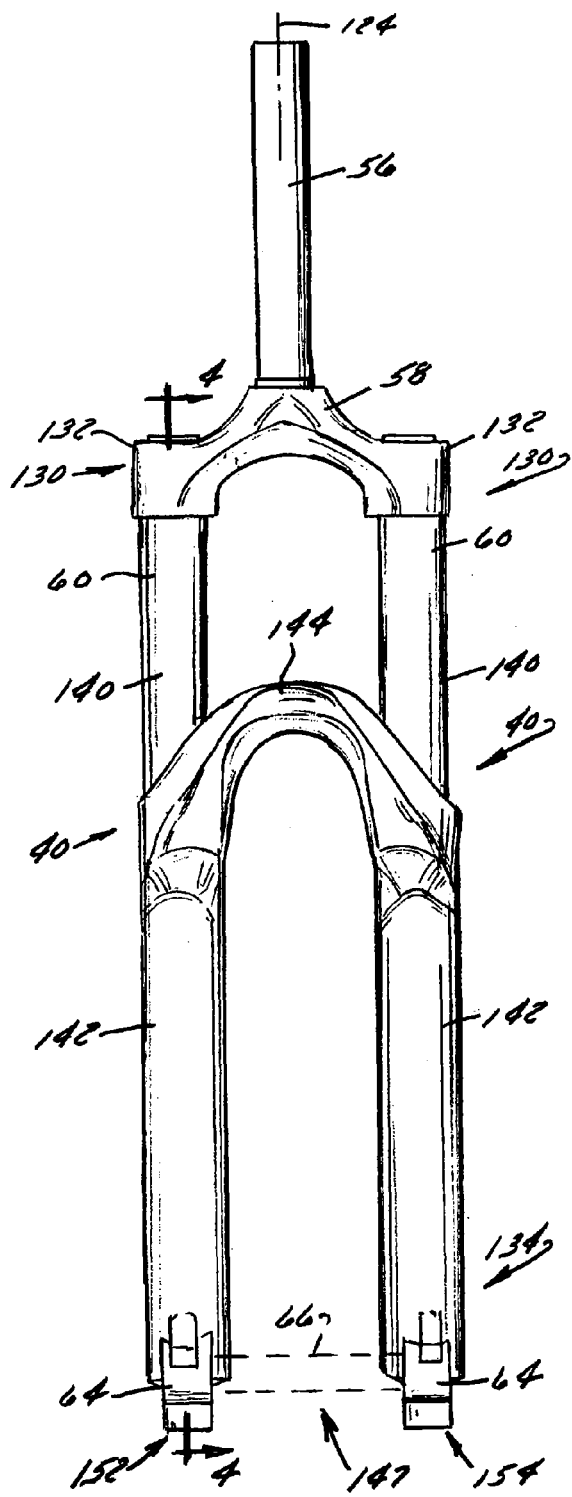
FIG. 3 is a front elevation view of the assembly shown in FIG. 2.

Referring to FIGS. 2 and 3, bicycle 30 includes two shock assemblies 40 that are each secured to fork crown 58 such that shock assemblies 40 form the forks 60 of bicycle 30. A first end 130 of each shock assembly 40 is secured to a respective shoulder or arm 132 of fork crown 58. A second end 134 of each shock assembly 40 forms fork tip 64 of each shock assembly. Stem 56 is generally centrally positioned with respect to the longitudinal axis of each fork assembly 40. Stem 56 forms a steerer tube and extends from fork crown 58 in a direction generally opposite shock assemblies 40. Stem 56 engages frame 32 of bicycle 30 such that rotation of stem 56 about a longitudinal axis 124 of stem 56 rotates forks 60 about axis 124 so as to steer bicycle 30.

Each shock assembly 40 includes a first sleeve, tube, or cap tube 140 that cooperates with a second sleeve, tube, or leg tube 142. Preferably, each cap tube 140 and leg tube 142 are telescopically associated. An optional arch 144 (FIG. 3) connects each leg tube 142 of adjacent shock assemblies 40 and defines a wheel cavity 146 between the adjacent forks 60. Each fork tip 64 includes a dropout or opening 147 that receives a respective end 152, 154 of axle 66. During loading and unloading of the wheel of bicycle 30, cap tubes 140 and leg tubes 142 translate relative to one another, indicated by arrow 150, thereby altering the distance between fork tips 64 and arms 132 of fork crown 58. Shock assemblies 40 absorb and dissipate a portion of the energy associated with an impact.

FIGS. 4-9 show various embodiments of shock assemblies 40 that are directed to a first general concept of implementing the present invention whereas FIGS. 13-22 are generally directed to embodiments of the present invention that relate to a second concept for implementing the present invention. Comparing the various embodiments shown in FIGS. 4-9 and FIGS. 13-22, it is appreciated that shock assemblies 40 include a valve arrangement or valve assembly that is supported by the piston of the shock assemblies whereas the shock assemblies shown in FIGS.

13-22 include a valve arrangement or valve assembly that is formed by the cooperation of the construction of the plunger with the construction of the piston. As used herein, the terms valve arrangement, valve assembly, and valve capture all such configurations and connote the fluidly separable interaction between a first or primary chamber of a shock assembly and a second or secondary chamber of the shock assembly.

With respect to FIGS. 4-9, each shock assembly 40 includes a cap tube 140 that slidably engages a leg tube 142. A hollow stem or compression rod 160 extends longitudinally along the leg tube 142 and includes a piston 162 that is supported at an end thereof. A moveable valve 164 is formed through piston 162 and selectively separates a volume generally above the piston and a volume enclosed by the compression rod.

Each shock assembly 40 includes a skewer or plunger 166 that is aligned with valve arrangement, valve assembly, or valve 164 so as to selectively fluidly connect a first cavity or chamber 168 and a second cavity or chamber 170 of each shock assembly 40. As alluded to above, each first chamber 168 and the second chamber 170 are selectively fluidly connected/separated by valve 164 that is supported by piston 162. First chamber 168 is generally defined as the area or volume enclosed by cap tube 140, piston 162, and a cap tube cap 172. It is appreciated that cap tube 140 and cap tube cap 172 be formed as a unitary tube having one closed end. That is, it is appreciated that cap tube cap 172 could be formed integrally with the body of cap tube 140. Second chamber 170 is defined as the area generally enclosed by compression rod 160 and the valve 164 supported by piston 162.

Figures 6, 7:
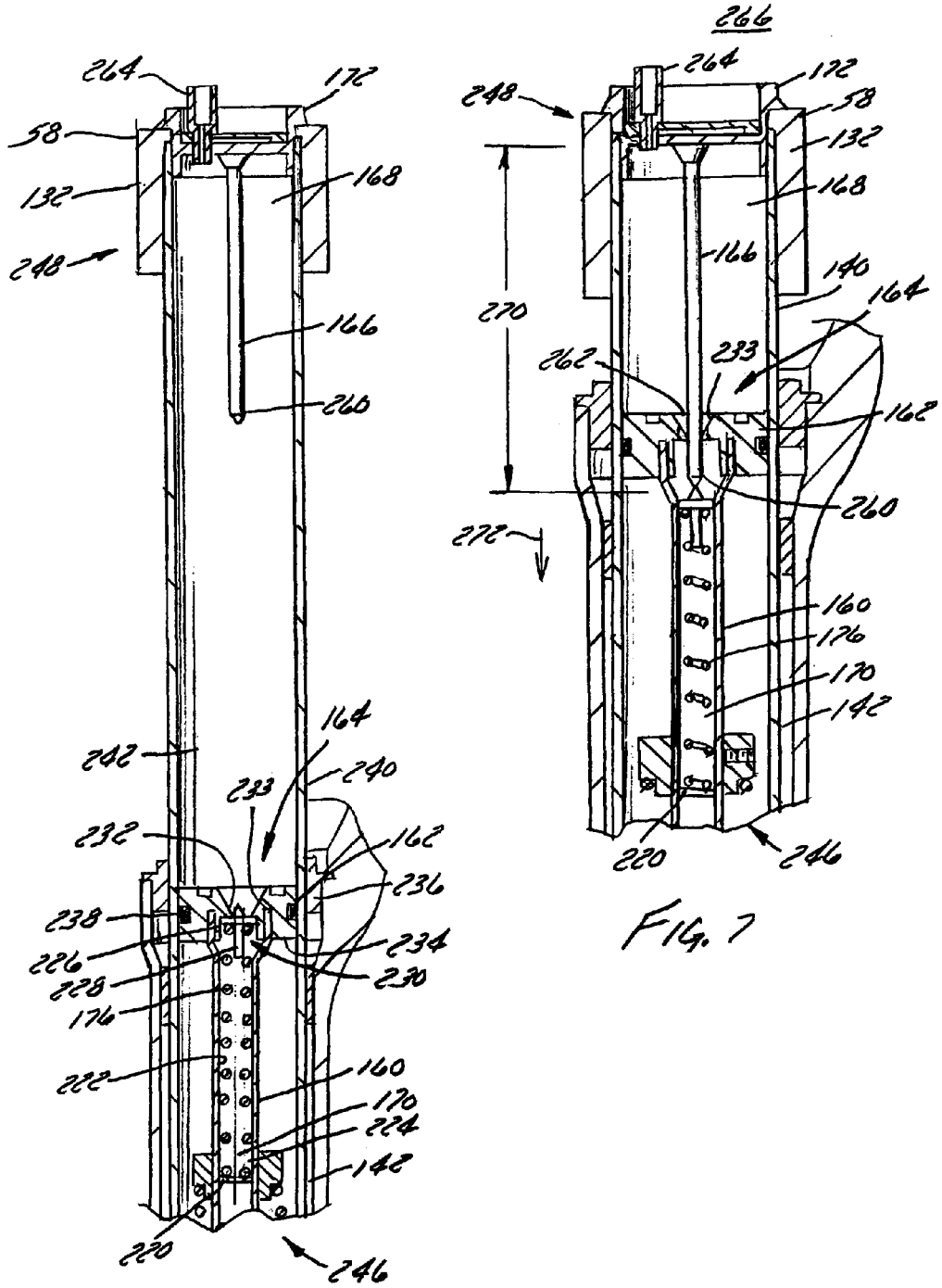
FIG. 6 is a view similar to FIG. 4 of a shock assembly according to another embodiment of the invention.
FIG. 7 is a view similar to FIG. 5 of the shock assembly shown in FIG. 6.

Still referring to each of the piston assemblies 40, a spring 176 biases valve 164 to a closed position (as shown in FIGS. 4, 6, and 8) so as to fluidly separate first chamber 168 from second chamber 170. Upon a designated displacement of dropouts 64 relative to arm 132 of fork crown 58, plunger 166 interacts with other structure of shock assembly 40 (such as structure associated with tube cap 172 as shown in FIG. 5) and/or interacts with valve 164 (as shown in FIGS. 7 and 9) such that first chamber 168 and second chamber 170 are fluidly connected to one another such that second chamber 170 contributes to the performance of shock assembly 40 when valve 164 is open.

Referring to shock assembly 40 shown in FIGS. 4 and 5, compression rod 160 offsets piston 162 from a first end 180 of leg tube 142 of shock assembly 40. Cap tube 140 is slidably positioned between piston 162 and leg tube 142. A seal 184 is positioned between the interface of cap tube 140 and leg tube 142 proximate a second end 182 of leg tube 142. A piston seal 186 is disposed between piston 162 and an interior surface 188 of cap tube 140. During shortening of the overall length of the shock assembly 40, piston 162 compresses the gas contained in first chamber 168 of shock assembly 40 thereby resisting or absorbing a portion of the energy associated with the compression stroke of the shock assembly. A bumper assembly 190 is disposed between piston 162 and dropout 64 and dampens motion as shock assembly 40 approaches a fully lengthened orientation during recovery from aggressive compressions.

Referring to FIG. 5, plunger 166 extends from a stem 190 of valve 164. A valve head 192 cooperates with a valve seat or seal 194 positioned about an opening 196 between first chamber 168 and second chamber 170. Plunger 166 passes through opening 196 and extends longitudinally along first chamber 168 toward tube cap 172. Plunger 166 includes a stop, lip, or head portion 198 that is sized to contain spring 176 generally between head portion 198 and an upper surface or face 200 of piston 162. Spring 176 normally biases valve head 192 into engagement with valve seat 194 thereby closing opening 196 and fluidly separating first chamber 168 from second chamber 170.

During compression loading of shock assembly 40, piston 162 translates to a position nearer arm 132 and compresses the volume of gas contained in first chamber 168. At a selected distance, indicated by arrow 202, plunger 166 contacts tube cap 172 of shock assembly 40. Continued translation of piston 162 in an upward direction toward tube cap 172 translates valve head 192 out of engagement with valve seat 194 in a downward direction, indicated by arrow 204. As valve head 192 disengages valve seat 194, gas compressed in first chamber 168 via the displacement of piston 162 relative to tube cap 172 passes through opening 196, indicated by arrows 206, and flows into second chamber 170. Accordingly, when valve 164 is opened, first chamber 168 and second chamber 170 both contribute to the operating performance of shock 40. Until valve 164 opens, of first and second chambers 168, 170, only first chamber 168 contributes to the performance of shock assembly 40 as second chamber 170 maintains a fixed shape and is fluidly isolated from first chamber 168.

Shock assembly 40 includes another valve or fill valve 210 that is supported by tube cap 172. Preferably, fill valve 210 is a Schrader valve as is commonly understood in the art. Fill valve 210 fluidly separates first chamber 168 from atmosphere. Referring to FIG. 4, during initial configuration of shock assembly 40, first chamber 168 can be pressurized to a desired value via fill valve 210. After an oscillation of shock assembly 40 that is sufficient to open valve 164 supported by piston 162, first chamber 168 and second chamber 170 attain a pressure associated with compressing the at-rest volume of gas of first chamber 168 to the combined volume of first chamber 168 and second chamber 170 when piston 162 attains distance 202. The overall performance of shock assembly 40 can be tailored to a riders' preference via the initial pressurization of first chamber 168. Additionally, regardless of the initial pressurization, shock assembly 40 also avoids overly progressive performance or non-responsive operation of the shock assembly at nearer full displacements by physically altering the size of the useable volume of the shock assembly. That is, the addition of second chamber 170 to the volume of first chamber 168 at an intermediate shock length allows for greater utilization of the shock across a wider range of available displacement lengths.

FIGS. 6 and 7 show another embodiment of shock assembly 40 that provides the same attributes in a slightly different manner. As shown in FIG. 6, spring 176 extends in a downward direction within second chamber 170 formed by compression rod 160. A projection, stop, or lip 220 extends from an interior wall 222 of compression rod 160 and engages an end 224 of spring 176 without fully unduly restricting movement of gas in second chamber 170.

Valve 164 includes a valve stem 228 that extends downward from a valve head 226. A second end 230 of spring 176 engages valve head 226 and biases valve head 226 into engagement with a valve seat 232. Valve seat 232 is formed in a downward facing side 234 of piston 162. An optional guide 233 is formed in piston 162 proximate valve 164 and is shaped to guide plunger 166 into engagement with valve 164. Cap tube 140 cooperates with a seal 236 and a piston seal 238 such that cap tube 140 telescopically cooperates with leg tube 142. Seal 236 cooperates with an exterior wall 240 of cap tube 140 and piston seal 238 cooperates with an interior wall 242 of cap tube 140. Such a configuration provides for the sliding and sealed interaction between cap tube 140, leg tube 142, and piston 162. A bumper assembly 246 that is similar to bumper assembly 190 is disposed about compression rod 160 generally below piston 162 and dampens movement nearer the full lengthening of shock assembly 40 shown in FIGS. 6 and 7.

Rather than extending from valve 164 supported by piston 162, plunger 166 of the shock assembly shown in FIGS. 6 and 7 extends in a downward direction from an end 248 of shock assembly 40. End 248 of shock assembly 40 is secured to arm 132 of fork crown 58. Preferably, plunger 166 is concentrically oriented with respect to valve 164, cap tube 140, and leg tube 142. Plunger 166 is aligned with valve 164 such that a distal end 260 of plunger 166 interacts with valve 164 to selectively open a passage 262 formed through piston 162. Passage 262 fluidly connects first chamber 168 and second chamber 170 and is selectively closable by operation of valve 164. Another valve or fill valve 264 is attached to tube cap 172 and selectively isolates first chamber 168 from atmosphere 266. Preferably, fill valve 264 is provided as a Schrader valve and is configured to allow first chamber 168 to be filled with air or another gaseous fluid.

Referring to FIG. 7, when piston 162 is moved to be within a given distance, indicated by arrow 270, from tube cap 172 of shock assembly 40, plunger 166 interacts with valve 164 and overcomes the bias of spring 176 thereby opening passage 262 between first chamber 168 and second chamber 170. When valve 164 is opened, the volume of first chamber 168 and second chamber 170 both contribute to the performance of shock assembly 40. Prior to obtaining the rate of compression associated with distance 270, only first chamber 168 contributes to the performance of shock assembly 40. Accordingly, shock assembly 40 reduces the stiffness associated with performance of shock assembly 40 during translation of piston 162 within distance 270.

Similar to the shock assembly shown in FIGS. 4-5, the shock assembly shown in FIGS. 6 and 7 maintains generally equal pressures within first chamber 168 and second chamber 170 only when plunger 166 contacts or opens valve 164. After unloading of a compression stroke wherein valve 164 was opened, the pressure of second chamber 170 is maintained at the level associated with valve 164 closing and the pressure of first chamber 168 continues to decrease as piston 162 continues to translate in a downward direction, indicated by arrow 272. The shock assembly 40 shown in FIGS. 6 and 7 is as responsive to compression loads as the shock assembly shown in FIGS. 4 and 5. Each such shock assemblies are equally responsive to operation across a wider range of the available length of translation between the cap tube and the leg tube.

FIGS. 8-9 show another embodiment of shock assembly 40. The construction of the shock assembly shown in FIGS. 8-9 more nearly resemble the shock assembly shown in FIGS. 6 and 7 as compared the shock assembly shown in FIGS. 4 and 5. Accordingly, similar structures have been given similar reference numbers and understandably operate in a similar manner.

As shown in FIGS. 8 and 9, plunger 166 extends in a downward direction from tube cap 172. Plunger 166 interacts with valve 164 in a manner similar to that described above with respect to FIGS. 6 and 7. Unlike the embodiment shown in FIGS. 6 and 7, the shock assembly shown in figs eight to 10 includes a fill valve assembly 280 wherein second chamber 170 is fluidly disposed between fill valve assembly 280 and first chamber 168.

Figure 10:
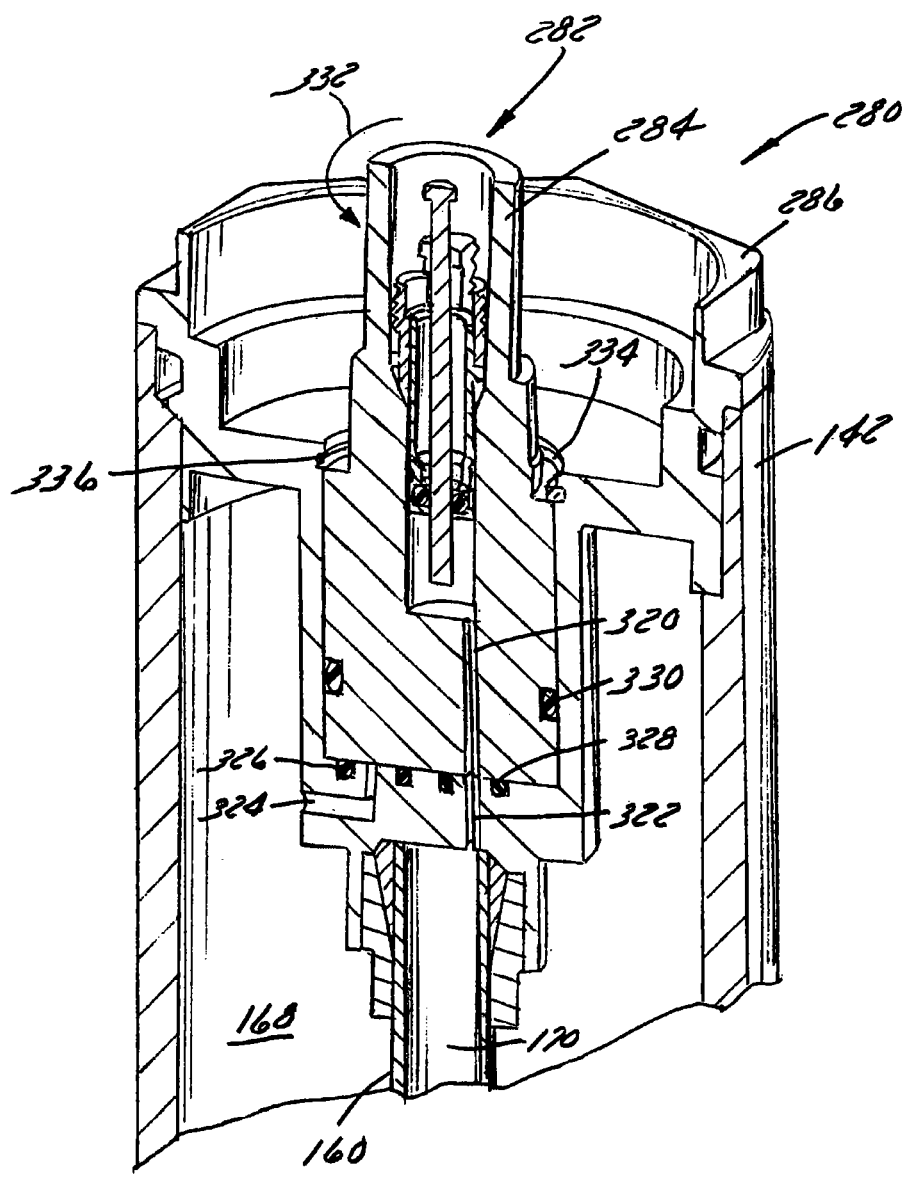
FIG. 10 is a detailed view of a fill valve assembly of the shock assembly shown in FIGS. 8 and 9 and having an operator that is movable by a user.

As shown in FIGS. 9 and 10, fill valve assembly 280 includes a fill valve 282, such as a Schrader, American valve, or Presta valve, that is attached to an operator 284. Operator 284 movably cooperates with a mount body 286 that is attached to leg tube 142. Operator 284 is rotatably connected to mount body 286 such that a passage or fill passage 320 formed in operator 284 can be selectively aligned with a first passage 322 that is fluidly connected to second chamber 170 and a second passage 324 that is fluidly connected to first chamber 168. A number of seals or O-rings 326, 328, 330 fluidly isolate each of passages 322, 324 and operator 284 relative to mount body 286. Such a construction allows a user to provide a desired pressure to each of first chamber 168 and second chamber 170 via rotation of operator 284, as indicated by arrow 332. A retainer, such as a snap ring, E or C-ring, or the like 334 cooperates with a groove 336 formed in mount body 286 and secures operator 284 longitudinally with respect to mount body 286. Although fill valve assembly 280 is operable to provide selective fluid connectivity with each of first and second chambers 168, 170, fill valve assembly 280 maintains fluid isolation between each of first and second chambers 168, 170 such that fluid connectivity between the respective chambers is determined by the relative translation of the cap tube and leg tube of the respective shock assembly.

Figure 11A:
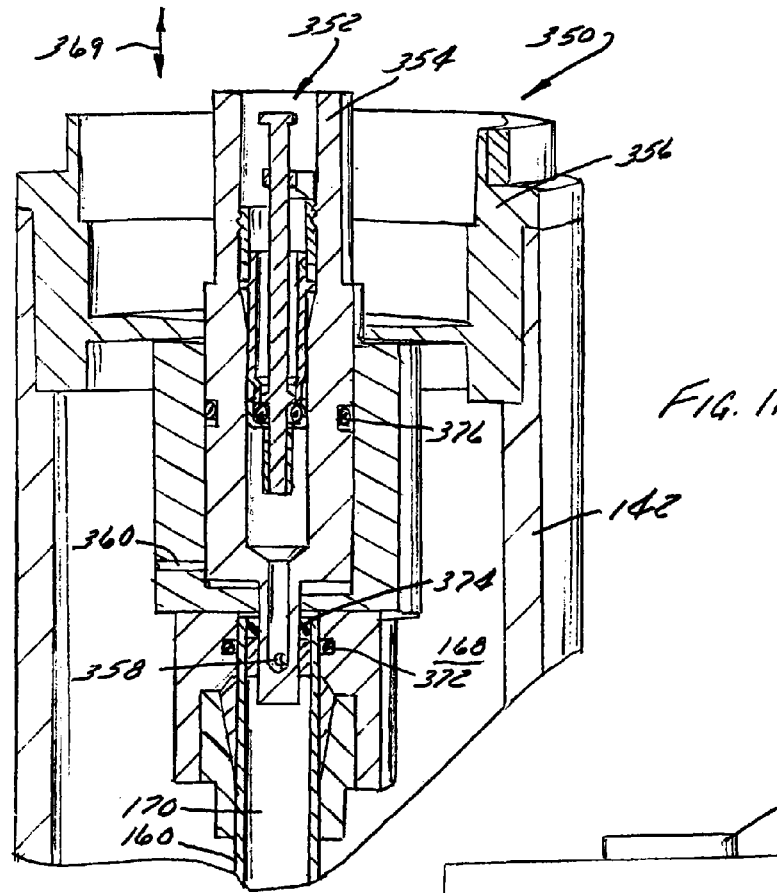
FIG. 11a is a detailed view of an example of a telescopic and rotatable connection between the fill valve assembly and a piston supported valve of the shock assembly shown in FIGS. 8 and 9.
Figure 12:
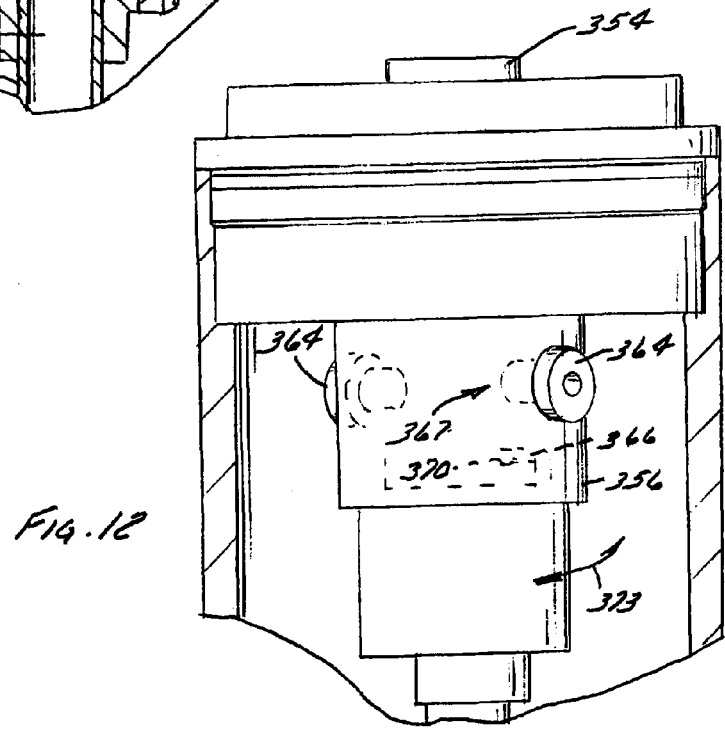
FIG. 12 is a perspective view of the fill assembly shown in FIGS. 11a and 11b and shows the engagement of the oppositely positioned guide pins with the mount body that is positioned about the moveable operator of the fill valve assembly.
Figure 11B:
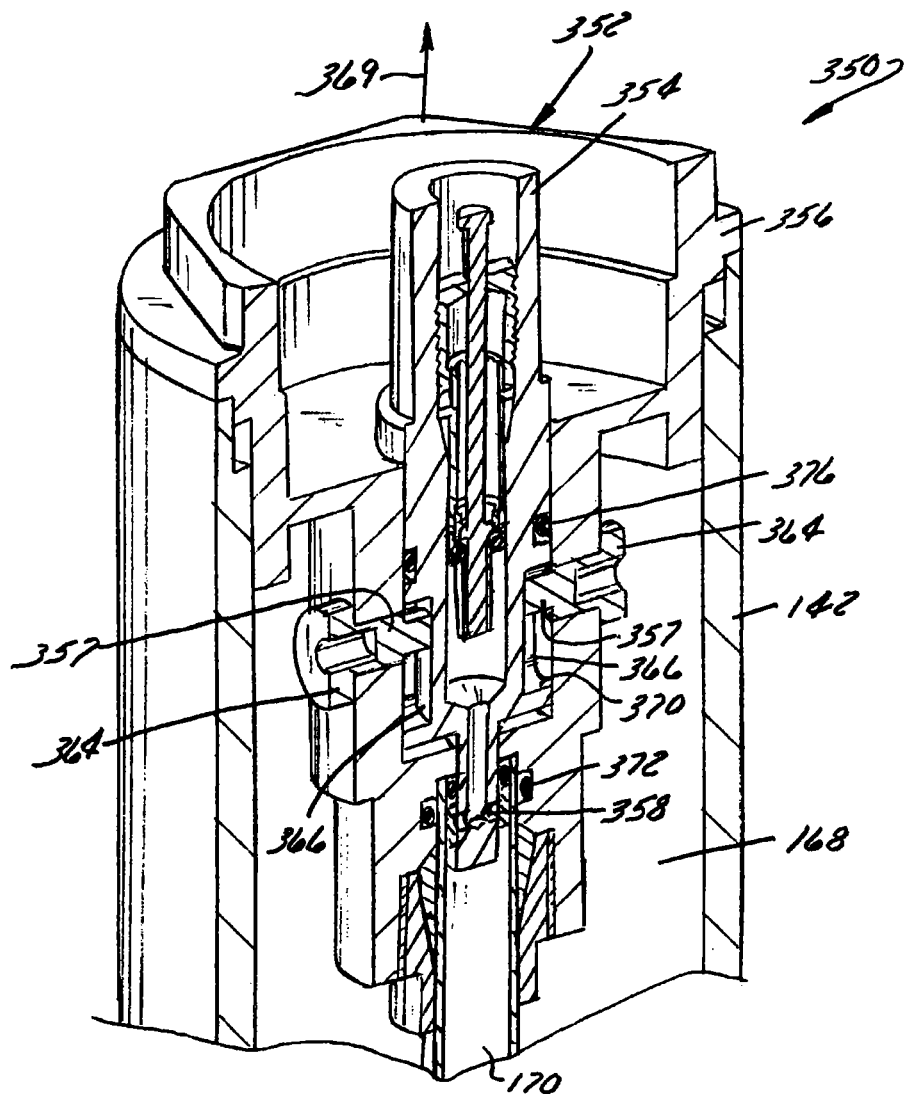

FIGS. 11a, 11b, and 12 show a fill valve assembly 350 according to another embodiment of the invention. Fill valve assembly 350 includes a fill valve 352, such as a Schrader, American valve, or Presta valve, that is attached to an operator 354. Operator 354 movably cooperates with a mount body 356 that is attached to one of cap tube 140 or leg tube 142. Operator 354 is rotatably and linearly translatable relative to mount body 356. Operator 354 includes a passage or fill passage 358 that can be selectively fluidly connected to first or second chambers 168, 170. Operator 354 is moveable between a "down position" and an "up position" so that either of the first chamber 168 or the second chamber 170 of the shock assembly can be selectively fluidly connected to atmosphere via fill valve 352. Such a construction allows a user to individually pressurize each of the first and second chambers 168, 170.

When located in the "down position", fill passage 358 is directly exposed to second chamber 170 such that fill valve assembly 352 is fluidly connected to second chamber 170. Still referring to FIGS. 11a and 11b, when in the "down position", fill passage 358 is fluidly isolated from a passage or port 360 that passes through mount body 356. As shown in FIGS. 11b and 12, a pair of pins 364 are engaged with, and extend beyond an interior surface of mount body 356. A distal end 357 of each pin 364 cooperates with a groove or generally L-shaped channel 366 formed in operator 356. The cooperation of pins 364 and channels 366 allows operator 354 to both rotate and translate in a longitudinal direction relative to mount body 356.

When operator 354 is translated toward the "up position", operator 354 translates in an outward direction, indicated by arrow 369, relative to a bottom 370 of each channel 366 as operator 354 translates along pins 364. When in the "up position" port 358 (FIG. 11a) is generally longitudinally aligned with passage 360 thereby fluidly connecting valve assembly 352 with first chamber 168. When in the "down position" as shown in FIGS. 11a, 11b, and FIG. 12, channel 366 includes a catch 367 formed at an end of channel 366 that is generally opposite bottom 370 of channel 366. The interaction of pins 364 and catch 367 prevent translation of operator 354 in a longitudinal direction when operator 354 is positioned in the "down position". Catch 367 and pins 364 resist upward translation of operator 354 during user interaction with valve assembly 352 when operator 354 is located in the "down position" and resists upward translation of operator 354 relative to mount body 356 due to pressurization of the second chamber 170. Such a construction allows the user to pressurize second chamber 170 without being required to bias operator 354 in a downward direction against bias associated with the air pressure contained within the first or second chamber. In a similar manner, when operator 354 is translated to the "up position", air pressure contained within the first or second chamber biases operator 354 upward. Said in another way, operator 354 is biased toward the "up position" by the pressurization of first and second chambers 168, 170 without a catch or other position retention assembly.

As best shown in FIGS. 11a and 11b, fill valve assembly 350 includes a number of seals, such as O-rings, 372, 374, 376 that provide a sealed interaction between operator 354, mount body 356, and compression rod 160. Seals 372, 374, 376 allow valve assembly 352 to be selectively fluidly connected to first chamber 168 and second chamber 170 and in a manner that maintains the fluid isolation therebetween. User rotation of operator 354, indicated by arrow 373, relative to mount body 356 allows pins 364 to be selectively engaged and disengaged from catch 367 thereby allowing selective longitudinal translation of operator 354 relative to mount body 356 and selective fluid connectivity of fill port 358 with first and second chambers 168, 170. Like fill valve assembly 280, although fill valve assembly 350 is operable to provide selective fluid connectivity with each of first and second chambers 168, 170, fill valve assembly 350 also maintains fluid isolation between each of first and second chambers 168, 170 such that fluid connectivity between the respective chambers is determined by the relative translation of the cap tube and leg tube of the respective shock assembly.

FIGS. 13-18 show shock assemblies according to further embodiments of the invention. Unlike the heretofore embodiments that include a generally solid bodied plunger or skewer that interacts with a valve arrangement, valve assembly, or valve that is supported by the piston of the shock assembly, the forthcoming shock assemblies include a generally hollow cored skewer or plunger that cooperates with the piston of the shock assembly in a manner wherein the cooperation of the skewer or plunger with the piston forms the valve arrangement, valve assembly, or valve that provides the selective fluid connectivity between the first and second chambers. However, similar to the previously disclosed shock assemblies, translation of the top tube relative to the bottom tube selectively fluidly connects the first and second chambers of the respective shock assemblies. Additionally, the forthcoming shock assemblies are also constructed to allow a user to selectively configure the pressurization of each of a first chamber and a second chamber so as to adjust the spring performance of the shock assemblies. Some of the following embodiments also allow independent initial pressurization of each of the respective chambers whereas others require an initial oscillation of the shock assembly to generate the initial pressure differential between the first and second chambers.

Figure 13:
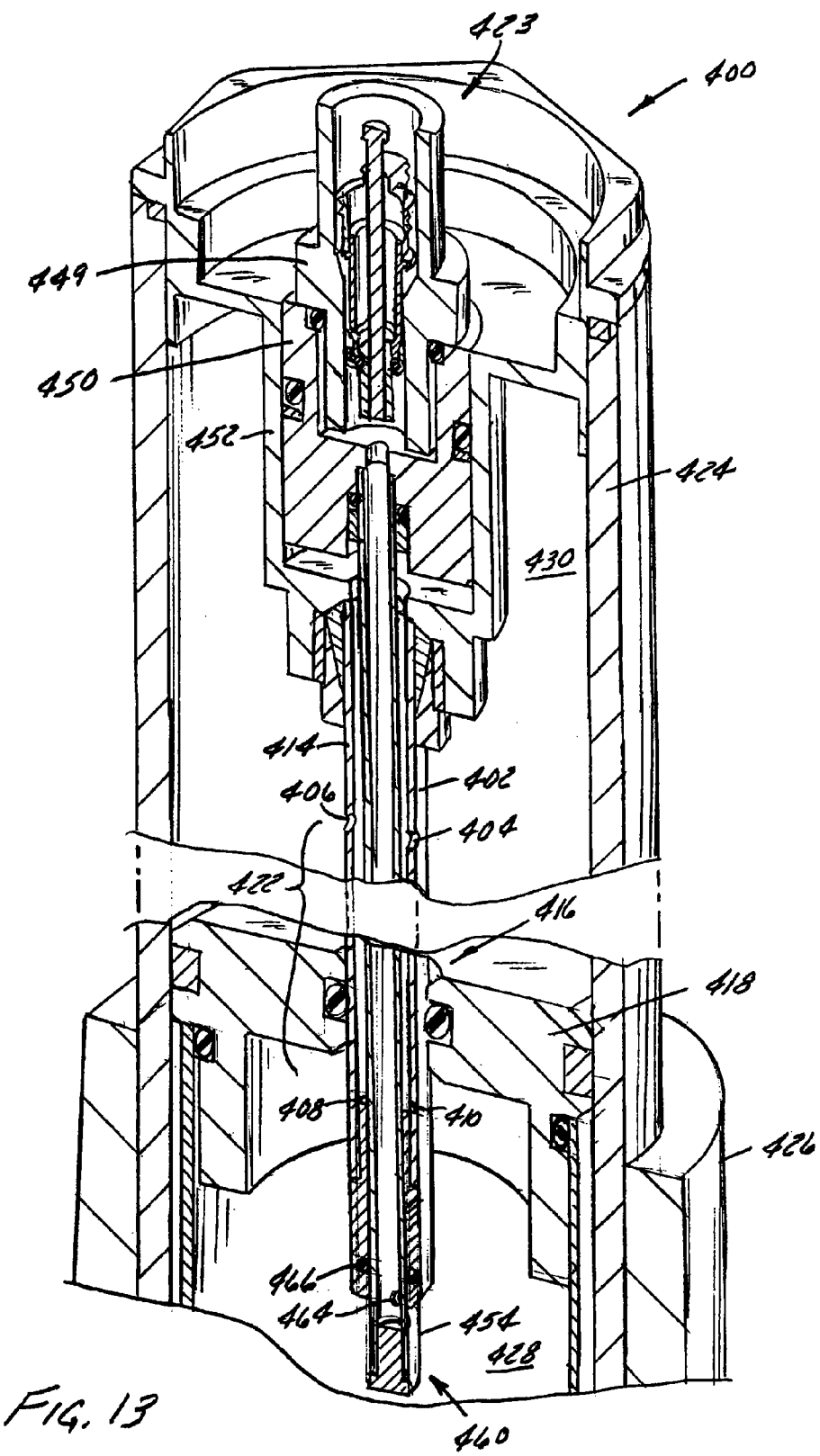
FIG. 13 is a view similar to FIGS. 11a and 11b and shows a fill valve assembly according to another embodiment of the invention

Referring to FIG. 13, a shock assembly 400 according to another embodiment of the invention includes a compression tube 402 that has one or more vents or ports 404, 406, 408, 410 formed through a sidewall 414 of the tube 402. Tube 402 cooperates with an opening 416 formed through a piston 418 of shock assembly 400 and provides the valved interaction between the first and the second chambers of the shock assembly. A seal 420 is disposed between piston 418 and tube 402. Tube 402 includes a generally hollow cavity 420 that allows fluid communication between ports 404, 406, 408, and 410 of tube 402. An offset or space is maintained between at least two of ports 404, 406, 408, and 410 along a longitudinal length of tube 402.

Figure 22:
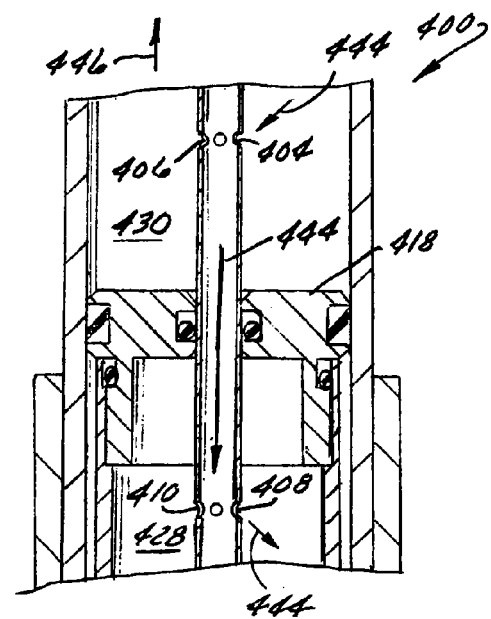
FIG. 22 shows the flow performance of a vented compression rod that can be used with the various shock assembly embodiments described above.

During oscillation of a top tube 424 relative to a bottom tube 426 of shock assembly 400, tube 402 translates in a direction aligned with the longitudinal axis of the shock so that, at a desired shock length, a lower port is fluidly connected to a second chamber 428 and another port is fluidly connected to the primary of first chamber 430. Referring to FIGS. 13 and 22, when ports 404, 406 and ports 408, 410 are positioned on generally opposite sides of piston 418, first and second chambers 430, 428 are fluidly connected via passage 420 of tube 402 as indicated by arrows 444 shown in FIG. 22. Such a construction allows the volumes of passage 420, first chamber 430 and second chamber 428 to contribute to the spring performance of shock assembly 400.

As shown in FIG. 22, during extension of shock assembly 400, tube 402 translates in an upward direction, indicated by arrow 446, relative to piston 418 so that each of ports 404, 406, 408, 410 are positioned on a common side of piston 418. As tube 402 translates in direction 446, the volume of second chamber 428 is fluidly isolate from the volume of first chamber 430 and the volume 420 of tube 402. The pressure of second chamber 428 remains generally unchanged when each of ports 404, 406, 408, 410 are positioned on a common side of piston 418 even though top tube 424 continues to translate in a direction away from bottom tube 426. However, the pressure of first chamber 430 reduces with continued upward translation of tube 402 relative to piston 418 as the volume associated with first chamber 430 continues to increase.

It is appreciated that the performance of shock assembly 400 can be uniquely configured by the altering the distance 422 between the upper and lower ports, by altering the position of the lowermost port along tube 402 so as to alter the relative position of top tube 424 relative to bottom tube 426 that results in fluid connectivity between the first and second chambers 430, 428, and/or by changing the size and/or number of ports provided in tube 402. It is further appreciated that first and second chambers 430, 428 of shock assembly 400 can be pressurized by generating an initial "over pressure" condition in first chamber 430 and oscillating the shock assembly so that the first and second chambers are fluidly connected via ports 404, 406, 408, 410 similar to the manner described above.

As shown in FIG. 13, shock assembly 400 includes a fill valve assembly 423 that allows a user to pressurize the internal cavities of shock assembly 400. In a first embodiment, fill valve assembly 423 is fixedly secured to shock assembly 400 so that the entirety of the initial pressurization of shock assembly 400 is directed to first chamber 430. The initial oscillation of shock assembly 400 allows a portion of the volume of gas initially provided to first chamber 430 to occupy second chamber 428. Those skilled in the art will appreciate that after such an initial oscillation, the pressure of second chamber 428 will be higher than the pressure of first chamber 430 when shock assembly 400 is in a rest configuration.

As mentioned above, it is further appreciated that the pressure differential between first and second chambers 430, 428 can be uniquely configured by altering the position of the lowermost ports 408, 410 along the longitudinal length of tube 402 relative to the total travel distance of shock assembly 400. That is, isolating the lowermost ports of tube 402 from the second chamber 428 at a point nearer the fully extended length of shock assembly 400 will provide a second chamber pressure that is nearer the first chamber pressure as compared to isolating the second chamber from the first chamber at positions that are nearer to the fully compressed length of shock assembly 400.

It is envisioned that shock assembly 400 could also be provided in a manner that allows a user to individually pressurize each of first and second chambers 430, 428. Referring back to FIG. 13, fill assembly 423 could be provided with a valve assembly 449 that is supported by a movable operator 450 that cooperates with a mount body 452 in a manner similar to that described above with respect to FIGS. 11 and 12. As shown in FIG. 13, an optional tube 454 extends from operator 450 and passes through passage 420 of tube 402. A distal end 460 of optional tube 454 includes a port 464 that can be selectively fluidly connected to second chamber 428 when operator 450 is in a "down position" and fluidly connected to passage 420 of tube 402 when operator 450 is an "up position".

A seal 466 is disposed between tube 402 and optional tube 454. Optional tube 454 is translatable so that port 464 can be selectively positioned above or below seal 466. When port 464 is positioned above seal 466, gas provided via fill valve assembly 423 is communicated only to first chamber 430 via passage 420 and ports 404, 406, 408, 410. When port 464 is positioned below seal 466, provided via fill valve assembly 423 is communicated only to second chamber 428. Optional tube 454 allows the user to selectively fill the two separate chambers with a single fill valve assembly and in a manner that does not require an initial oscillation of the shock assembly. Understandably, a fill valve assembly could be provided for each of first and second chambers 430, 228 and allow the individual pressurization of each of the respective chambers of the shock assembly.

It is appreciated that optional tube 454 allows the user to individually pressurize each of first and second chambers 430, 428 without initial oscillation of shock assembly 400 in a manner similar to the embodiments described above. It is further appreciated that the tube 454 can contribute to the performance and/or operation of a shock assembly equipped therewith manners that allow selective pressurizing of the first and second chambers, facilitate fluid connectivity between the first and second chambers, and allow fluid isolation between the respective plunger and the volumes of the respective first and second chambers. Some of the disclosed shock assemblies include a hollow, continuous, and open-ended plunger, such as the swaged and/or mechanically grooved plungers 840, 880, such that the hollow plunger extends into the second volume thereby allowing a user to selectively fill the second chamber or volume of the shock assembly (such as with fill valve assembly 352). As is further understood, for those embodiments that include a ported plunger, such as plunger 402, a distal end of the ported plunger is closed, plugged, and/or sealed so as to maintain fluid separation between the first and second chambers of the shock except for when the respective ports are positioned on generally opposite sides of the respective piston during oscillation of the shock assembly.

FIGS. 14 and 15 show a shock assembly 500 according to another embodiment of the invention. Shock assembly 500 includes a top tube 502, a bottom tube 504, a compression rod 506, a tube skewer or plunger 508, a piston 510, and a sleeve 512. Plunger 508 extends from a fill valve assembly 514 and slidably cooperates with an opening 516 formed in piston 510. A seal 518 is disposed between piston 510 and plunger 508. The interaction between piston 510, seal 518, and plunger 508 provides a valved interaction between the respective chambers of the shock assembly.

Sleeve 512 is sealingly supported between piston 510 and a sleeve base 520 and generally defines a second chamber 526 of shock assembly 500. Plunger 508 includes a bypass section 522 that has a reduced cross-sectional area as compared to the remainder of the plunger 508. Bypass section 522 is constructed to pass through opening 516 of piston 510 and cooperate with piston 510 in a manner that allows fluid communication between a first chamber 524 and the second chamber 526 of shock assembly 500. Bypass section 522 allows plunger 508 to cooperate with piston 510 in a non-sealing manner.

Figure 20:
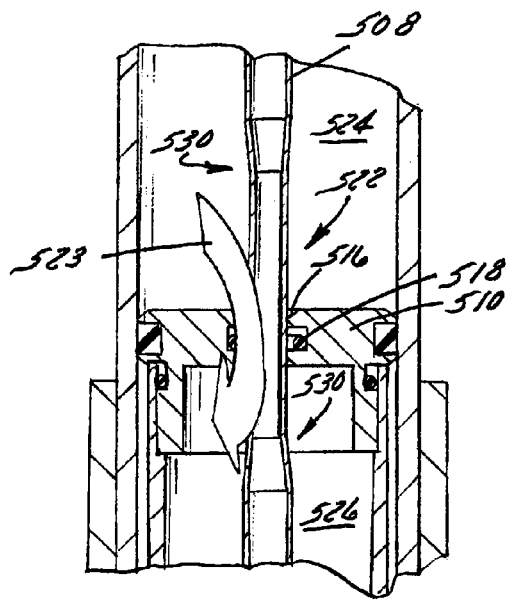
FIG. 20 is shows the flow performance of the swaged compression rods shown in FIG. 19.

As shown in FIG. 20, when bypass section 522 is positioned in opening 516 of piston 510, plunger 508 loosely cooperates with seal 518 thereby allowing fluid flow, indicated by arrow 523, between first chamber 524 and second chamber 526 of shock assembly 500. Opposite ends of bypass section 522 include swaged or transition portions 530 that provide guided interaction between plunger 508 and seal 518 of piston 510 as bypass section 522 passes through opening 516.

Referring back to FIGS. 14 and 15, fill valve assembly 514 can be selectively fluidly connected to a passage 540 defined by a sidewall 542 of plunger 508. Gas introduced through fill valve assembly 514 is directed directly to second chamber 526. During an initial oscillation of shock assembly 500, as bypass section 522 enters opening 516 formed in piston 510, a portion of the initial gas charge passes into first chamber 524. As top tube 502 is allowed to extend away bottom tube 504, a lower portion 542 of plunger of plunger 508 interacts with opening 516 of piston 510 and so as to fluidly isolate the first and second chambers 524, 526 of shock assembly 500. Continued translation of top tube 502 in a direction away from bottom tube 504 allows the pressure of first chamber 524 to continue to decrease while the pressure of second chamber 526 is maintained at desired value.

During subsequent oscillation of shock assembly 500, the volume of passage 540 of plunger 508 and second chamber 526 contribute to the spring performance of shock assembly 500 only when top tube 502 and bottom tube 504 attain relative positions such that bypass section 522 interacts with piston 510 thereby allowing fluid connectivity between the first and second chambers 524, 526. As shown in FIG. 15, sleeve base 520 includes a cavity 548 that is shaped and positioned to generally cooperate with an end portion 550 of plunger 508 as shock assembly 500 approaches a fully compressed orientation. Such a construction allows the volume of plunger 508 to be selectively isolated from contributing to the nearly fully compressed spring performance of shock assembly 500.

Figure 16:
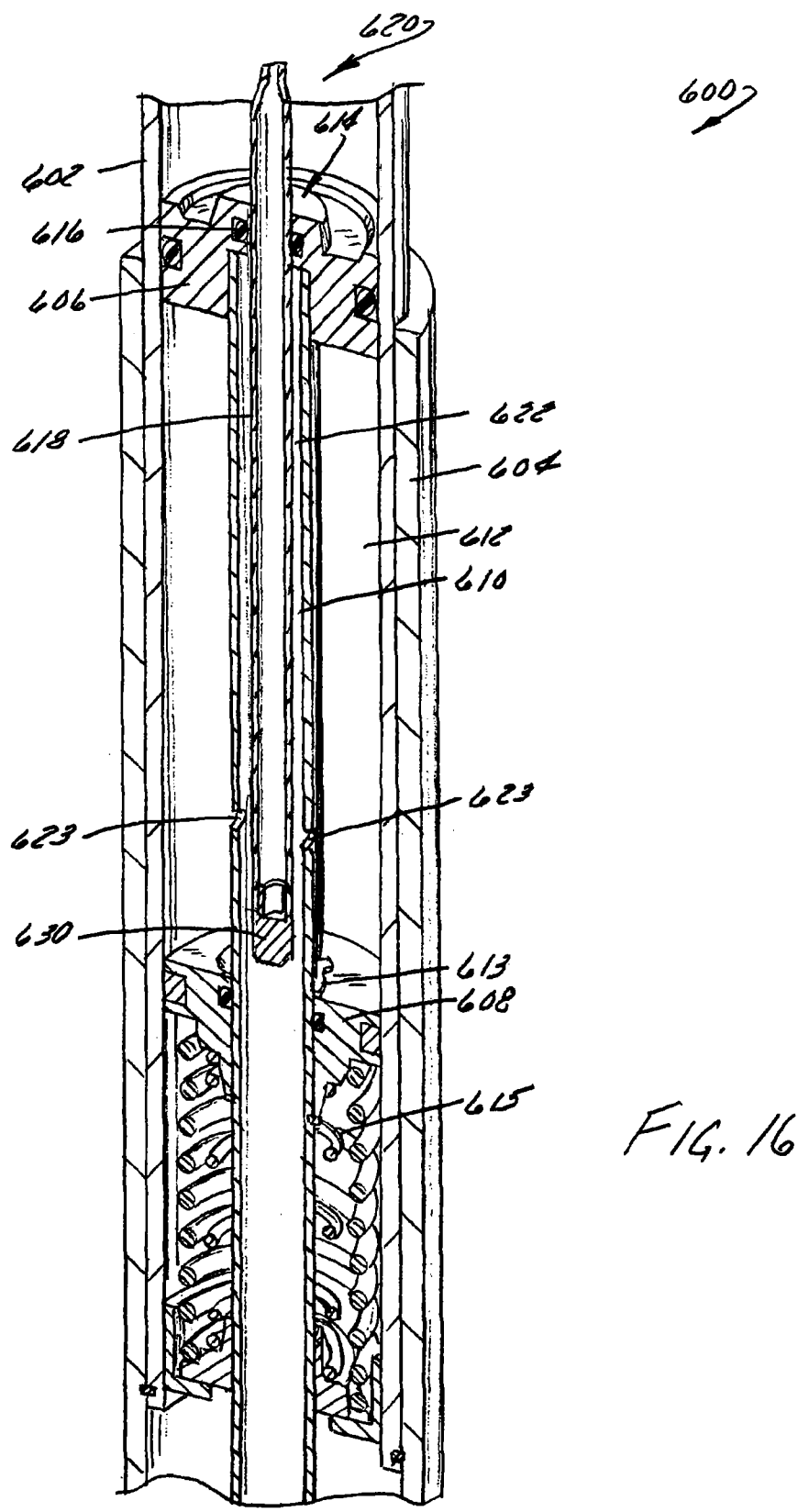
FIG. 16 is a view similar to FIG. 15 of a shock assembly according to another embodiment of the invention.

FIG. 16 shows a shock assembly 600 according to another embodiment of the invention. The construction and operation of shock assembly 600 is generally similar to the description provided above with respect to shock assembly 500 except for the exclusion of sleeve 512. Shock assembly 600 includes a top tube 602 that slidably cooperates with the bottom tube 604. A first piston 606 and a second piston 608 are each supported by a compression rod 610. First piston 606 and second piston 608 are attached to compression rod 610 in an offset manner so that a second chamber 612 is formed therebetween. In a preferred embodiment, a pair of clips 613, 615 are engaged with compression rod 610 on generally opposite sides of second piston 608 so as to generally fix the position of second piston 608 relative to first piston 606.

First piston 606 includes an opening 614 having a seal 616 and cooperates with a skewer or plunger 618 similar to plunger 508. Plunger 618 includes a bypass section 620 that cooperates with opening 614 formed in piston 606 so as to fluidly connected a first chamber 611 and second chamber 612. Plunger 618 is positioned within a cavity 622 defined by compression rod 610. At least one vent or port 623 is formed in compression rod 610 and allows the volume of compression rod 610 to contribute to the volume of second chamber 612. During sufficient oscillation of shock assembly 600, bypass section 620 cooperates with opening 614 of piston 606 thereby allowing fluid communication between first chamber 611 with cavity 622 of compression rod 610 and second chamber 612 between pistons 606, 608.

It is appreciated that shock assembly 600 could be provided with a fill valve assembly in accordance with any of the above embodiments. For instance, shock assembly 600 could be provided with a fill valve assembly similar to that described above with respect to shock assembly 500. Alternatively, shock assembly 500 could be provided with an optional plug 630 that cooperates with plunger 618. Understandably, such a construction would require that the fill valve assembly communicate directly with one of first or second chambers 611, 612, or that plunger 618 be provided with a port to facilitate fluid communication with one of first or second chambers 611, 612. For instance, plunger 618 could be provided with an internally connected fill valve assembly similar to the arrangement shown in FIG. 14 and a port that allows fluid communication with either of first chamber 611 or cavity 622 of compression rod 610. It is appreciated that such arrangements would require an initial oscillation of the shock assembly to allow first and second chambers 611, 612 to attain their respective operating pressures.

FIGS. 17 and 18 show a shock assembly 700 according to yet another embodiment of the invention. Shock assembly 700 includes a top tube 702 and a leg tube 703 that are telescopically associated and function in a manner similar to the shock assemblies previously described. However, unlike the previously described shock assemblies, shock assembly 700 includes a gas based negative spring system rather than a coil spring based negative spring or bumper system such as bumper system 190 shown in FIG. 4.

A skewer or plunger 704 that is constructed similar to any of plungers 402, 618, 800, 840, 880 slidably cooperates with a piston assembly 706 that is positioned within top and leg tubes 702, 703. Piston assembly 706 includes a main piston 710 that is attached to the shock assembly 700 and offset from an end of leg tube 703 by a compression rod 710. A secondary or negative piston 712 is slidably positioned about compression rod 710. A deformable bumper 714 is disposed between main piston 710 and negative piston 712.

A bypass collar 720, a guide collar 722, and a cap 724 are attached to main piston 710. Guide collar 722 includes an opening 726 that cooperated with plunger 704 to allow the selective fluid communication between a first chamber 728 and a second chamber 730 of shock assembly 700 in a manner similar to that described above with respect to plungers 402, 618, 800, 840, 880. Shock assembly 700 includes a third chamber 740 that is fluidly isolated from first and second chambers 728, 730. Bypass collar 720 includes one or more ports 734 that allow fluid communication between a first cavity 736 and a second cavity 738 of third chamber 740. Third chamber 740 is generally sealed and provides a top out spring characteristic as the volume of third chamber 740 is reduced by the outward translation of top tube 702 relative to leg tube 703. As shock assembly 700 approaches a fully extended orientation, negative piston 712 moves toward main piston 710 thereby compressing top out bumper 714 as well as the volume of gas associated with third chamber 740. Third chamber 740 includes a first cavity 744 and a second cavity 746 that are fluidly connected by one or more passages 748 formed through bypass collar 720. The volume of second cavity 746 that is enclosed by cap 724 can be configured to provide a desired contribution to the top out bumper performance of shock assembly 700. Alternatively, during assembly, third chamber 740 can be pressurized to attain a desired top out spring performance of shock assembly 700 without having a coil spring positioned proximate piston assembly 706.

The volume of first chamber 728 is defined by top tube 702 and cap 724 and nearly the entirety of the second chamber 730 is defined by compression rod 710. It is appreciated that the volume of plunger 704 could be contributed to first chambers 728 by providing one or more fluid ports, similar to ports 404, 406 and a plug, similar to plug 630 or contributed to second chamber by providing a non-ported or vented body having an open end that remains in fluid communication with the second chamber throughout the range of movement of the top and leg tubes. Such a construction allows utilization of a greater portion of the volume enclosed by the top and leg tubes for the primary and secondary chambers of the shock assembly and allows the secondary chamber to be formed nearly entirely by the compression rod. It is further appreciated that the performance of shock assembly 700 can be altered by changing the diameter of either of the compression rod and/or the plunger and that the top out spring performance can be manipulated by altering the shape of cap 724.

Figure 19:
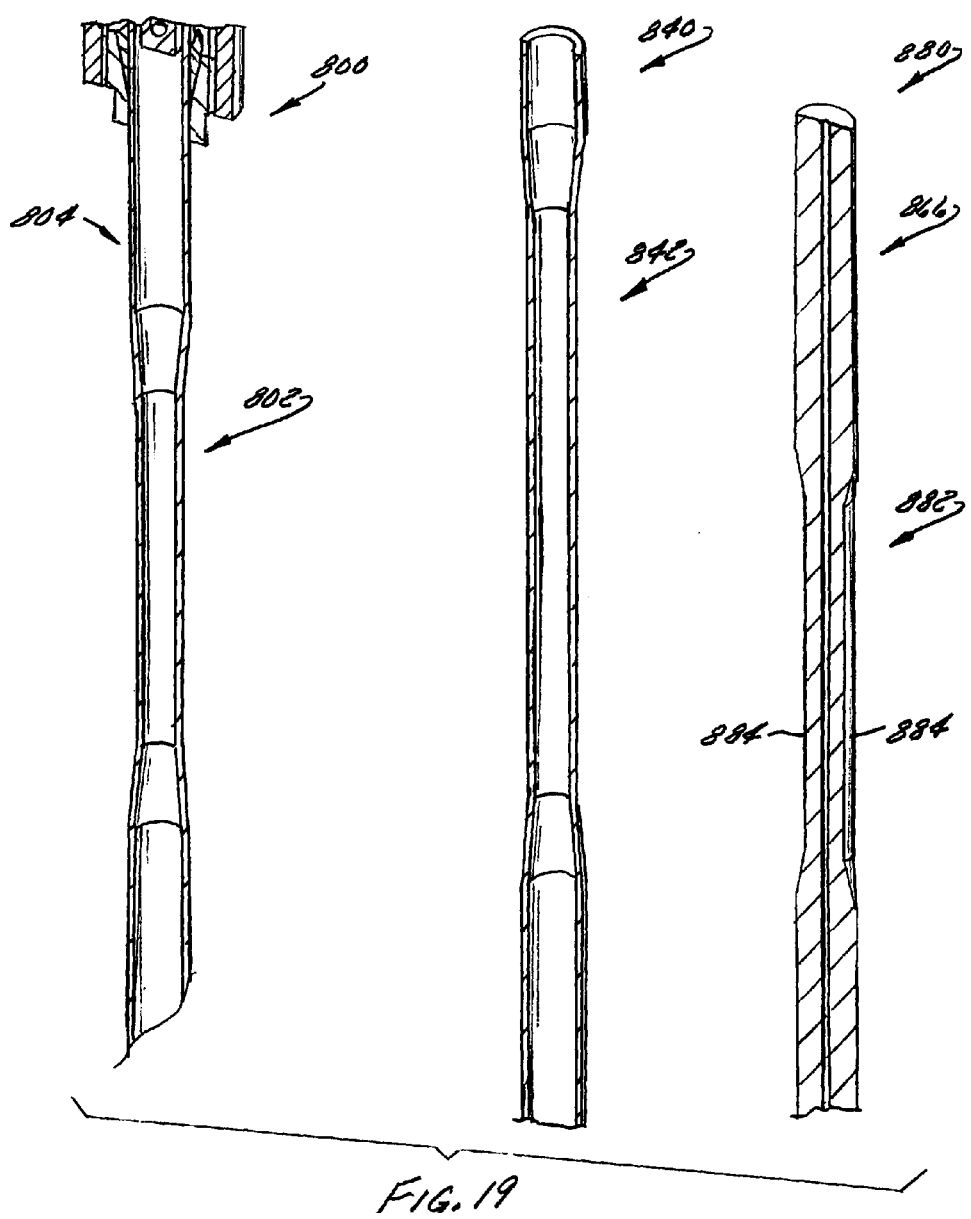
FIG. 19 shows various compression rods having a swaged section that can be used with the various shock assembly embodiments described above.

FIG. 19 shows various skewers or plungers 800, 840, 880 for use with shock assemblies 400, 500, 600, 700. Comparing plungers 800 and 840, it can be noted that the length of a bypass section 802 of plunger 800 is shorter than a length of a bypass section 842 of plunger 840. Those skilled in the art will appreciate that such a construction alters the performance of a shock assembly equipped with either of plunger 800 or 840 by altering the fluid connectivity between a first and second chamber of the shock assembly. Said in another way, it is appreciated that plunger 840 will allow fluid communication between a first and a second chamber of a respective shock assembly over a greater range of translation of a cap tube relative to the leg tube as compared to plunger 800. Accordingly, it is appreciated that the spring characteristic of any of shock assemblies 400, 500, 600, 700 can be altered by manipulating the length and position of bypass section 802, 842, 882 relative to the length of the plunger, the relative travel of the cap tube and the leg tube, as well as the position of the bypass section throughout the range of motion of the respective shock assembly. As described further below with respect to FIG. 21, providing a "shortened" period of fluid communication between the respective chambers of the respective shock assemblies allows for a progressive spring response near the end of the spring curve.

As compared to plungers 800, 840, plunger 880 has a thicker wall construction and a narrower passage formed through an interior thereof. Plunger 880 includes a bypass or bypass section 882 that can be generally asymmetrical with respect to the cross section of plunger 800 and can be milled or machined into the sidewall of the plunger as compared to the swaged sections associated with plunders 800, 840. Plunger 880 has a fairly robust construction and the asymmetric nature of bypass section 882 allows plunger 880 to be maintained in a fairly concentric position with respect to a longitudinal axis of the corresponding piston. Furthermore, although bypass 882 of plunger 880 is shown to include two generally oppositely positioned grooves 884 that extend along bypass section 882, it is envisioned that bypass section 882 could include any number of grooves or flutes such as one or more than two and provide a desired fluid connectivity between the first and second chambers of a respective shock assembly.

It is further appreciated that the interior shape of plungers 800, 840, 880 can be oriented to contribute to or alter the spring performance of a shock assembly equipped therewith. For instance, for those embodiments wherein the interior cavity of the plunger contributes to the volume of either of the first or second chamber of the shock assembly, plungers 800, 840 will provide a more compliant spring performance as compared to a comparable shock assembly equipped with plunger 880 due to the reduced volume thereof. In a similar manner, it is also appreciated that the reduced cross-sectional area of the interior passage of plunger 880 can provide a more resistive shock performance when plunger 800 is incorporated into those embodiments of shock assemblies 400, 500, 600, 700 that rely on fluid communication through the interior of the plunger to facilitate fluid communication between the first and second chambers of the respective shock assemblies. Preferably, the spring characteristics and speed sensitivity, as described further below, can be tailored to provide a desired response by altering the shape/volume associated with the bypass section. It is further envisioned that the bypass section can be positioned so that fluid connectivity between the first and second chambers is allowed only during a desired range of position of a top tube relative to a bottom tube of a respective shock assembly. As described further below, in preferred embodiments, regardless of the construction of the plunger and its cooperation with the piston, shock assemblies according to the present invention allow the selective coupling and decoupling of the contribution of the second chamber to the performance of the shock assembly.

Still referring to FIG. 19, it can be seen that, if each of plungers 800, 840, and 880 were provided in a respective similarly configured shock assembly, the first and second chambers of the shock assembly equipped with plunger 840 would be in fluid communication for a greater duration over the entire travel of the shock assembly by virtue of bypass 842 extending a greater length of plunger 840 than a corresponding length of extension of bypasses 802, 882 of plungers 800, 880. Preferably, bypass section 842 is in effect or allows fluid communication between the respective chambers of a shock assembly when the top tube and bottom or leg tube are from between approximately 66% of a total available compressive travel and the respective shock assemblies fully compressed relative travel. Said in another way, bypass section 842 allows fluid communication between the first and second chambers when the shock assembly is between about 66% and 100% a fully compressed orientation. Comparatively, bypass section 802 is in effect between about approximately 66% and 92% of a fully compressed orientation. An upper portion 804 of plunger 800 and an upper portion 886 of plunger 880 terminates the fluid communication between the first and second chamber of shock assembly so as to isolate the contribution of the second chamber from the spring performance of the shock assembly during a final portion, i.e. from about 92% to 100%, of the total translation of the shock assembly. Preferably, upper portion 804, 886 are positioned to effectuate fluid isolation between the first and second chambers when the shock assembly is between about 83% to about 92% from an at rest configuration of the top and leg tubes of the respective shock assembly. As described below with respect to FIG. 21, such a construction provides a shock assembly having a progressive spring response as the shock assembly approaches a near full compression.

It is further appreciated that the bypass fluid performance arrangements described above are applicable across a range of product platforms and are not specific to translation of a given shock orientation. That is, it is appreciated that the present invention is applicable to shock assemblies having a number of ranges of operation including the fairly common configurations wherein the top tube and leg tube facilitate translations in the range of about 100 mm (about 3.93 inches), 120 mm (about 4.72 inches), and about 140 mm (about 5.52 inches). These values are given by way of example and it is appreciated that shock operating ranges other than these common parameters are envisioned.

As shown graphically in FIG. 21, the force to displacement performance of each of plungers 800, 840, 880 is very nearly comparable over a majority of the travel of a corresponding shock assembly. Trend 888 is indicative of the performance of a shock assembly equipped with a plunger having a shorter bypass or a bypass that terminates along the plunger in a manner such that fluid isolation can be achieved before the shock assembly attains a fully compressed condition. Trend 890 is indicative of a similar shock assembly equipped with a plunger having a longer bypass section.

With respect to trend 888, as the respective shock assembly approaches a fully compressed, i.e., a shortening of the overall length of the shock assembly, those shock assemblies equipped with a shortened bypass section, such as plungers 800, and 880, terminate the fluid communication between the first and second chambers thereby providing a more progressive spring response, indicated by portion 892 of trend 888, near the end of the full travel of the shock assembly. Comparatively, trend 890 provides a fairly linear force to displacement response through nearly the entire range of travel of the shock assembly. As indicated by those portions of trends 888, 890 beyond roughly 4 inches of shock travel, shock assemblies equipped with shortened bypass sections allow the respective shock assemblies to accommodate greater forces through the final translations of the shock assemblies as compared to those shock assemblies that do not decouple the fluid connectivity between the first and second chambers at a configuration that is deep into the overall travel of the shock assembly.

It is further appreciated that shock assemblies having ported plungers such as that shown in FIG. 22 can be configured in a similar manner. That is, as described above, ports 404, 406 of plunder 402 can be positioned nearer ports 408, 410 so that the first and second chambers 430, 428 are allowed to fluidly couple and decouple throughout a single travel direction of shock assembly 400. Said in another way, when each of ports 404, 406, 408, 410 are positioned on a common side of piston 418, only first chamber 430 contributes to the spring performance of shock assembly 400 such that the results associated with trend 888 can be attained with either of a ported plunger, such as plunger 402, or a plunger having an external bypass section, such as plungers 800, 880.

Figure 23:
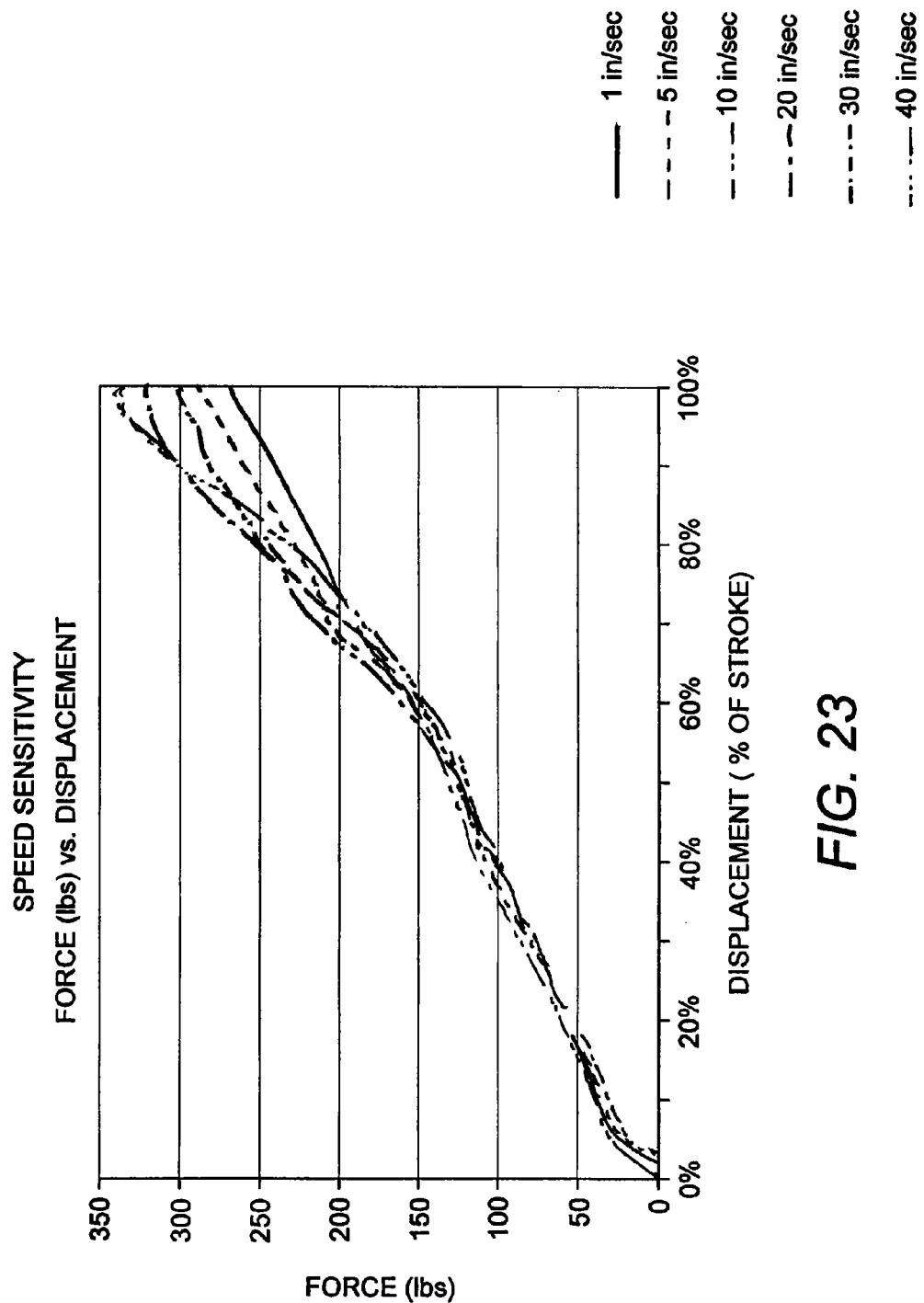
FIG. 23 graphically shows the speed sensitivity performance that can be achieved with the shock assemblies according to the present invention.

FIG. 23 shows graphically speed sensitivities that can be achieved with various shock assemblies according to the present invention. The speed sensitivity correlates the velocity of the plunger shaft, and thereby the rate of change of position of the top tube relative to the bottom tube, and the spring characteristics of the shock assembly. As shown in FIG. 23, the various shock assemblies have comparable force to displacement ratios when the two chambers are not fluidly connected—for displacements that are less than about 66% of available travel in this case—for speed sensitivities of about 1 inch per second to about 40 inches per second. For shock displacements above about 66% of available travel, when the two chambers are fluidly connected, the speed sensitivity deviates from a more linear response at lower shaft velocities of about 1 inch per second to more progressive speed sensitivities as the shaft velocities increases to about 40 inches per second. Said in another way, the various trends shown in FIG. 23 evidence the decoupling of the fluid connectivity between the first and second chambers of the respective shock assemblies as the shock assemblies experience travels over 66% of available travel for those shocks that are constructed to allow the fluid decoupling of the second chamber deep in the travel of the shock assembly. As the speed of compression of the shock assembly increases, the spring performance of the shock assembly provides a more progressive response to the continued compression of the shock assembly as the rate of the compression increases. Such a construction allows the shock assemblies to provide compressibility at higher shock force loadings. As such, the shock assemblies improve rider comfort by providing a greater operating range of the respective shock assemblies.

It is further appreciated that the speed sensitivity of the various shock assemblies disclosed herein can also be manipulated by changing the cross sectional area associated with the respective bypass sections. That is, constructing the shock assemblies to have a bypass section that allows fairly un-restricted fluid communication between the first chamber and the second chamber will provide a lower level of available speed sensitivity than a shock assembly having a somewhat restrictive bypass section, such as a ported plunger having only a single port that allows fluid communication between the first and second chambers. The single port restricts the fluid flow between the first and second chambers and thereby increases the available range of the speed sensitivity of the shock assembly. Providing a lesser restrictive bypass section, such as with a larger swaged section to out diameter plunger ratio or a number of first and second chamber ports, increases the area available for fluid communication between the first and second chambers thereby decreasing the speed sensitivity of the shock assembly over the available translation. The spring curve of such a shock assembly would continue to be more linear as shaft velocities increased as compared to a shock assembly having a more restrictive bypass section. Accordingly, the speed sensitivity of the various shock assemblies can also be adjusted by manipulating the area associated with the bypass section as well as the position of the bypass section relative to shock travel as discussed above. Said in another way, speed sensitivity can be increased as the area associated with a respective bypass section of a respective shock assembly is decreased. The shock assemblies disclosed herein can be uniquely configured to satisfy a variety of user demands as well as a variety of operating ranges and preferences.

Each shock assembly described above provides a shock absorber wherein a first tube is movable relative to a second tube. After a selected displacement relative to the two tubes, a second volume is fluidly connected to a first volume and thereby alters the performance of the shock assembly during translation of the tubes beyond selected displacements. Each shock assembly provides a dual chamber shock having a valved interface that separates the chambers and whose operation is non-fluidly controlled. The plunger of each shock assembly non-fluidly overcomes the closed bias of the valve arrangements. By physically manipulating the valve arrangements, each of the heretofore described shock assemblies provide a shock that can be conveniently configured for operation at individual preferences and which provides improved shock performance across a wider range of the total length of displacement of the shock assembly. Such preferable structure further enhances the functionality of the respective shocks.

Therefore, one embodiment of the invention includes a bicycle shock assembly that has a first sleeve and a second sleeve. The second sleeve is engaged with the first sleeve such that the first sleeve and the second sleeve are connected in a telescopic manner. A piston is enclosed by the first and second sleeves and defines a first volume on one side of the piston and a second volume on an opposite side of the piston. A valve arrangement is formed between the first and second volumes and configured to fluidly separate the first volume from the second volume. A plunger is configured to cooperate with the piston to selectively open the valve arrangement to fluidly connect the second volume to the first volume.

Another embodiment of the invention usable with one or more of the features associated with the above embodiment includes a method of altering the in-use performance of a bicycle shock. The method includes forming a first chamber and a second chamber that are separated by a piston. The first and second chambers are selectively fluidly connected as a function of translation of a cap tube relative to a leg tube by translating a plunger through an opening formed in the piston.

Another embodiment of the invention useable with one or more of the aspects or embodiments includes a bicycle suspension system having a cap tube attached to a first bicycle structure and a leg tube attached to a second bicycle structure. The cap tube and the leg tube are telescopically associated to allow translation between the first and second bicycle structures. A piston that separates a first volume from a second volume is disposed in a cavity enclosed by the cap and leg tubes. The piston encloses the first volume whose pressure increases as distal ends of the cap and leg tubes move toward one another. A plunger cooperates with the piston to fluidly connect the first and second volumes when the distal ends of the cap and leg tubes are a selected distance apart.

It is further appreciated that one or more aspects of the various embodiments of the invention can be combined with one or more features of the various embodiments to achieve shock constructions, configurations, and operations other than the preferred configurations that have been described above. The forthcoming claims are intended to encompass all such deviations and combinations of the respective features disclosed herein. That is, no one aspect of the present invention is exclusive to the particular embodiment within which such aspect is discussed.

The present invention has been described in terms of the preferred embodiments, and it is recognized that equivalents, alternatives, and modifications, aside from those expressly stated, are possible and within the scope of the appending claims. It is further appreciated that the respective features of any one of the embodiments discussed above is not necessarily solely exclusive thereto. Aspects of one or more of the embodiment may be equally applicable to other embodiments. That is, as described in the forth coming claims, the invention includes all of the embodiments as well as aspects specific thereto.

What is claimed is:

1. A shock assembly for a bicycle comprising:
a first sleeve;
a second sleeve engaged with the first sleeve such that the first sleeve and the second sleeve are connected in a telescopic manner and are configured to translate through a stroke;
a piston coupled to the second sleeve and enclosed by the first and second sleeves and defining a first positive gas volume on one side of the piston and a second positive gas volume on an opposite side of the piston, wherein the first positive gas volume and the second positive gas volume are configured to increase pressure in a same one direction of the translation and decrease pressure in the same other direction of the translation;
a hollow tube coupled to the first sleeve and configured to cooperate with the piston to selectively fluidly connect the second positive gas volume to the first positive gas volume;
wherein the hollow tube and the piston are configured to:
isolate the first positive gas volume and the second positive gas volume during a first translation range of the stroke of the first sleeve and the second sleeve;
fluidly couple the first positive gas volume and the second positive gas volume during a second translation range of the stroke of the first sleeve and the second sleeve;
wherein the stroke traverses a distance from a state where the second sleeve is fully compressed into the first sleeve to a state where the second sleeve is fully extended from the first sleeve;
the stroke includes the first translation range and the second translation range; and
the first translation range and the second translation range do not overlap in a single direction of the stroke.

2. The shock assembly of claim 1, wherein the hollow tube and the piston are further configured to the isolate the first positive gas volume and the second positive gas volume during a third translation range of the stroke of the first sleeve and the second sleeve, and the first translation range, the second translation range, and the third translation range do not overlap in a single direction of the stroke.

3. The shock assembly of claim 1, wherein the first translation range, the second translation range, and the third translation range are arranged consecutively in the stroke.

4. The shock assembly of claim 1, wherein the hollow tube includes a bypass section.

5. The shock assembly of claim 1, wherein the bypass section comprises grooves.

6. The shock assembly of claim 1, wherein the bypass section comprises a swaged section.

7. The shock assembly of claim 1, further comprising a fill valve assembly supported by one of the first and second sleeves for pressurizing the first positive gas volume.

8. The shock assembly of claim 7, wherein the fill valve assembly can be selectively fluidly disposed between the second positive gas volume and atmosphere.

9. The shock assembly of claim 8, wherein the fill valve assembly is movable to selectively fill the first positive gas volume, the second positive gas volume, or the first positive gas volume and the second positive gas volume.

10. The shock assembly of claim 1, further comprising a first shock assembly and a second shock assembly that support generally opposite lateral sides of a wheel axle.

* * * * *